(12) United States Patent
Kasai

(10) Patent No.: US 7,871,481 B2
(45) Date of Patent: Jan. 18, 2011

(54) METHOD FOR PRODUCING A HERMETIC PLASTIC ZIPPER AND A HERMETIC PLASTIC ZIPPER

(76) Inventor: Juichi Kasai, 29-3, Fukazawa 3-chome, Setagaya-ku, Tokyo 158-0081 (JP)

( * ) Notice: Subject to any disclaimer, the term of this patent is extended or adjusted under 35 U.S.C. 154(b) by 1035 days.

(21) Appl. No.: 10/580,233

(22) PCT Filed: Nov. 11, 2004

(86) PCT No.: PCT/JP2004/016725

§ 371 (c)(1),
(2), (4) Date: Jan. 19, 2007

(87) PCT Pub. No.: WO2005/048763

PCT Pub. Date: Jun. 2, 2005

(65) Prior Publication Data

US 2007/0130733 A1    Jun. 14, 2007

(30) Foreign Application Priority Data

Nov. 21, 2003    (JP) .............................. 2003-392350

(51) Int. Cl.
*B32B 37/00* (2006.01)
(52) U.S. Cl. ....................... 156/73.1; 156/64
(58) Field of Classification Search ............... 156/64, 156/73.1, 290, 308.2, 308.4, 358, 362, 580.1, 156/580.2
See application file for complete search history.

(56) References Cited

U.S. PATENT DOCUMENTS 5,007,143 A    4/1991    Herrington
5,020,194 A    6/1991    Herrington et al.
5,749,987 A *  5/1998    Wannebo ..................... 156/64
6,293,701 B1   9/2001    Tomic
6,780,263 B2 * 8/2004    Delisle ......................... 156/64
2004/0045138 A1 3/2004   Kasai

FOREIGN PATENT DOCUMENTS

| JP | 3000905 | 6/1994 |
| JP | 09-323708 | 12/1997 |
| JP | 2938784 B2 | 6/1999 |
| JP | 11-198233 | 7/1999 |
| JP | 2000-2662307 | 9/2000 |
| JP | 2001-286308 | 10/2001 |
| JP | 2002-1770220 | 6/2002 |
| JP | 2003-128090 | 5/2003 |
| JP | 2004-196324 | 7/2004 |
| WO | WO 02/38459 A1 | 5/2002 |
| WO | WO 03/022697 A1 | 3/2003 |

* cited by examiner

*Primary Examiner*—James Sells
(74) *Attorney, Agent, or Firm*—Rothwell, Figg, Ernst & Manbeck, P.C.

(57) ABSTRACT

A method of continuously manufacturing a hermetic plastic zipper wherein the plastic zipper has a readily peelable plastic layer prolonging in a lengthwise direction of the plastic zipper, the readily peelable plastic layer is welded using ultrasonic wave so that the peeling intensity of the welded portion is within a certain range, the method is characterized in that while the engaging portions are brought into a engaged state, the portion of the plastic zipper where the readily peelable plastic layer exists is inserted between an ultrasonic horn and an anvil, and the readily peelable layer is welded by using ultrasonic wave under a condition wherein the distance L between the ultrasonic horn and the anvil is uniformly held at an distance of $H \geq L \geq 0.85H$ wherein H stands for a maximum thickness of the plastic zipper under the engaged state.

3 Claims, 17 Drawing Sheets

Fig.3
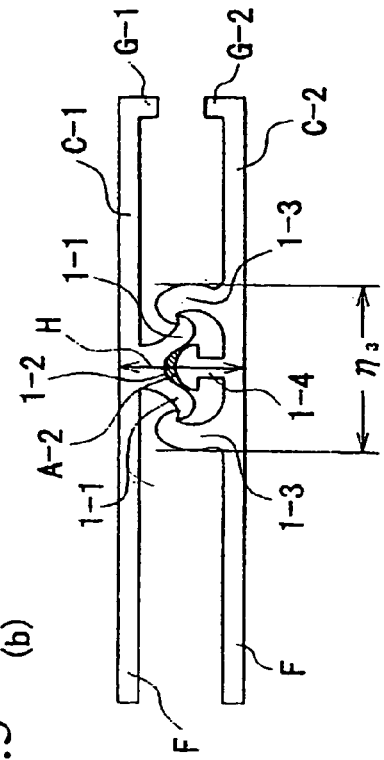 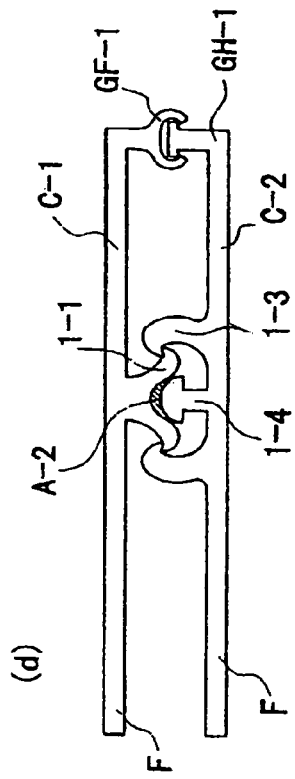
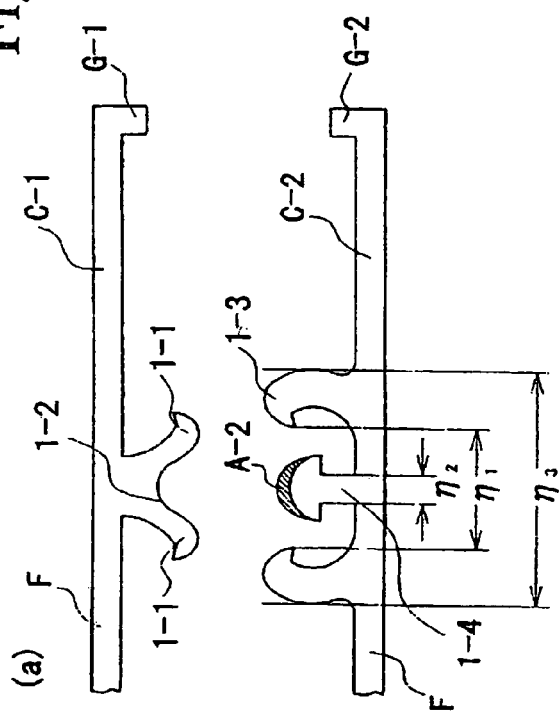 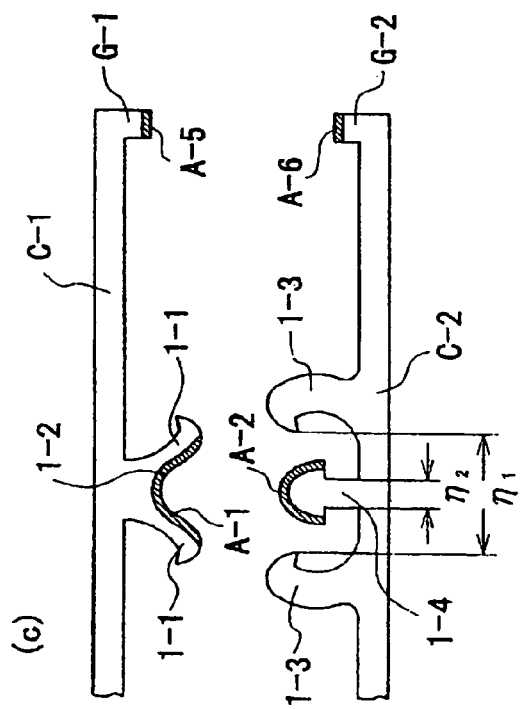
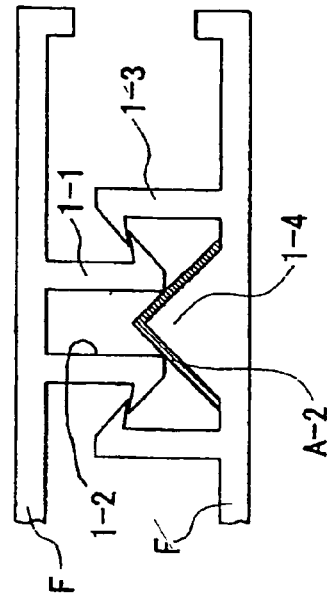

METHOD FOR PRODUCING A HERMETIC PLASTIC ZIPPER AND A HERMETIC PLASTIC ZIPPER

CROSS REFERENCE TO RELATED APPLICATION

This application is a 35 U.S.C. §371 National Phase Entry Application from PCT/JP2004/016725, filed Nov. 11, 2004, and designating the United States.

TECHNICAL FIELD

The present invention relates to a plastic zipper with a slider which is readily openable and re-closable while it is hermetic-sealing and which is used for packaging materials such as foods, medicines, electronic products, etc., and the present invention also relates to bags equipped with the plastic zipper.

BACKGROUND ART

Bags equipped with plastic zippers are widely used for packing materials such as foods, medicines, electronic products and other goods. Especially, bags equipped with plastic zippers fitted with sliders are widely used for packing materials as readily openable and re-sealable packing materials.

When an inside pressure-resistance, i.e., property wherein the bag does not open even if the pressure therein rises, is attached great weight to a bag with a plastic zipper, the plastic zipper which has been disclosed by the present inventor in patent document 1 (Japanese Patent Application Laid-open No. 2000-262307) or patent document 2 (Japanese Patent No. 2938784), or the zipper using the principle of a lever which has been disclosed in patent document 3 (U.S. Pat. No. 5,007,143) or patent document 4 (U.S. Pat. No. 6,293,701) has been known as a plastic zipper with a slider which has a large intensity against opening from a content side of the bag. Although the plastic zipper disclosed in the patent document 2 is itself hermetic, the other plastic zippers disclosed in the other patent documents or conventional plastic zippers do not have hermetic property.

However, with diversification of contents of packages, still more advanced air tightness of package has been required, and a sealed package having been opened by the wrong purpose or by an inaccurate error may cause various troubles such as mixing of foreign substances in the contents of the package or spoiling the quality of contents, and therefore, an additional function that is able to detect the broken seal of the package after sealing the package is desired.

Conventionally known examples of plastic zippers with sliders having functions for detection of broken seal are illustrated in FIGS. 14 to 19. In the example illustrated in FIG. 14, which is a partially sectioned perspective view, and in FIG. 15, which is a sectional view seen in arrow A-A' in FIG. 14, a bag body 9-3 is fitted with a zipper 9-2 and a slider 9-1, and the slider and the zipper located at the upside portion of the bag body 9-3 are covered by the covering film 9-4 having perforations 9-5. When a new bag is opened in this example, the zipper is opened or closed by the slider after tearing off the perforations 9-5. Therefore, the system is simple and has a good operability. However, there is a disadvantage that the bag has inferior appearance and inferior industrial productivity.

In the example illustrated in FIG. 16, which is a partially sectioned perspective view, and in FIG. 17, which is a sectional view seen in arrow B-B' in FIG. 16, a bag 9-3 is equipped with a zipper 9-2 and a slider 9-1, and a partitioning film 11-4 equipped with perforations 11-5 is formed inside the bag. In this example, when the pristine bag is opened first, after the zipper 9-2 is opened by the slider 9-1, the perforations 11-5 formed in the partitioning film 11-4 are torn off to open the bag. Accordingly, the bag has a good appearance and productivity. However, when the contents of the bag are fine particles such as powder, there may occur a problem that the fine particles are stuck on the portion of the partitioning film 11-4 and that smooth discharge cannot be performed.

In the example illustrated in FIG. 18, which is a perspective view, a bag 9-3 is equipped with a zipper 9-2 and a slider 9-1, and in the bag body with zipper, spot welding is carried out at an upper portion of the zipper 9-2, while the zipper is put in the closed position. The spot welded portion is cut off by using the slider 9-1 upon first break of seal of a new bag body.

In the example illustrated in FIG. 19 which is a perspective view, the zipper 9-2 disposed on the bag 9-3 is put into a closed state, and the upper part of zipper 14-4 equipped with perforations 14-5 is partially cut out where the slider 9-1 is equipped. In this system, the upper part of the zipper 14-4 is torn out along the perforations 14-5 by means of the slider 9-1 when the seal is broken.

Although the system of FIGS. 14 and 16 has an advantage that it is able to keep air tightness of the bag even if perforations are applied, however, the system of FIGS. 18 and 19 cannot be applied to such usage that requires long preserving period as a retort packed food because the air tightness of this bag depends on the air-tightness of the zipper.

The present inventor disclosed in patent document 5 (WO 02/38459 A1), a plastic zipper fitted with a slider and a bag body equipped with the plastic zipper fitted with the slider, wherein the high air tightness can be achieved so that a long term preservation of contents of the bag becomes possible, while it is readily openable, and it has a function indicating unjust unsealing of the bag. Namely, the objects of the invention was achieved by welding the top portion of the male hook 3-1 and the bottom portion of the female hook 3-2, and in addition, projections for guiding the slider, in the plastic zipper with the slider, respectively, through the readily peelable plastic layers A-1, A-2, A3-5 and A3-6, as illustrated in FIG. 4(a), or welding a continuous pressing rib 1-4 and a continuous tightening wall 1-2 of the plastic zipper with a slider, and in addition, the slider guiding projections G-1 and G-2, respectively, through the readily peelable plastic layers A-2, A-1, A-5 and A-6, as exemplified in FIG. 3 (c), and the resin of the welded portion are made from two different colors.

Although the above mentioned patent document 5 discloses that heat sealing using a hot air nozzle, a heated plate for heat sealing, an ultrasonic welding, a high frequency welding, etc. are available for the method for welding a zipper portion by a readily peelable plastic layer, actually carried out method is not disclosed.

Concerning the way of welding the zipper portion by the readily peelable plastic layer, the following information has been found later as a result of whole hearted study conducted by the present inventor. Although the heat sealing using the hot air nozzle or adhesion using the heated plate has an advantage that it can be applied easily at a low equipment cost, it has a disadvantage that it is hard to uniformly control its welding area or its welding position. Therefore, although the readily peelable plastic layer can be welded, it is difficult to maintain the peeling strength of the readily peelable plastic layer within a certain range. Moreover, if the hook portion of the zipper is heated excessively, it will deform, and then it may cause defects of the zipper function. As a result, since it occurs frequently that the slider operation becomes extremely heavy and that the zipper does not open or not close, there is a precarious situation in industrial production.

When welding is carried out by using high frequency heat sealing, the voltage will rise if the thickness of the zipper is large, and a short circuit may occur between the electrodes, and therefore, an applicable shape of the zipper will be restricted to the thin shaped zipper. Accordingly, the high frequency heat sealing has a problem that it cannot be applied to a thick shaped plastic zipper.

Regarding ultrasonic heat seal, universal welding equipment of batch-wise transfer type has been known wherein a film supplied intermittently in a bag making machine etc. is sandwiched between an ultrasonic horn and an anvil which are vertically movable, and the ultrasonic horn and the anvil are repeated to move in a direction perpendicular to the sealed layer after the film is sealed by means of ultrasonic wave. (For example, patent document 6 (Japanese Patent Application Laid-open No. Hei 9-323708)) Moreover, when a continuously supplied film is welded by means of ultrasonic wave, it is proposed to detect the passing speed of the film and adjust the imposed energy so as to correspond to the passing speed of the film. (Under a low speed, amplitude of an oscillator or pressurization is made small, and under high speed, amplitude of an oscillator or pressurization is increased.) (Patent document 7 (Japanese Patent Application Laid-open No. Hei 11-198233))

However, it has not been known to continuously weld by means of ultrasonic wave while the engaging portions of the plastic zipper are maintained in a stable state wherein the adhesion area and the adhesion intensity are maintained stable in a lengthwise direction for a long distance.

Moreover, any method has not been known wherein the welding is carried out to the specific position of a plastic zipper through the readily peelable plastic layer and wherein the peeling intensity at the welded portion is adjusted to a value in a predetermined range.

Generally speaking the exfoliation performance of readily peelable resin, the adhesion area and the peeling strength will change depending on the welding time, the welding temperature, or the cooling time, even if resin is the same. In the case of adhesion between flat surfaces such as films, any problems hardly arise substantially since a peeling angle (an angle between the exfoliated films upon peeling off) does not change, even if the adhesion area or the peeling strength may change somewhat. However, when the adhesion surface is formed in such a complicated shape as the zipper of the present invention, a relative peeling angle changes sharply responding to minute change of exfoliation area. Consequently, since the nature of exfoliation and the peeling strength have tendency to change sharply, management of the adhesion area or the peeling strength is very important for maintaining the quality of the product, and another technology different from that used for adhesion of films is required.

Moreover, in the patent document 8 (WO 03/022697 A1), the present inventor disclosed a small, powerful slider that is able to open such a hermetic plastic zipper having a strong opening intensity wherein the engaging portions are welded through readily peelable plastic layer.

Patent document 1 Japanese Patent Application Laid-open No. 2000-262307
Patent document 2 Japanese Patent No. 2938784
Patent document 3 U.S. Pat. No. 5,007,143
Patent document 4 U.S. Pat. No. 6,293,701
Patent document 5 WO 02/38459 A1
Patent document 6 Japanese Patent Application Laid-open No. Hei 9-323708
Patent document 7 Japanese Patent Application Laid-open No. Hei 11-198233

DISCLOSURE OF THE INVENTION

Problems to be Solved by the Invention

It is an objects of the present invention to provide a manufacturing method of a hermetic plastic zipper which has a readily peelable plastic layer prolonging to a lengthwise direction of the plastic zipper wherein the readily peelable plastic layer is welded by ultrasonic wave and at the same time the peeling intensity of the welded portion is maintained within a certain fixed range. Furthermore, it is another object of the present invention to provide a continuously manufacturing method of the hermetic plastic zipper wherein the peeling intensity of the welded portion is in a constant range.

Moreover, it is a still other object of the present invention to provide a hermetic plastic zipper which is characterized in that the peeling strength of the welded portion through the readily peelable plastic layer is substantially uniform in a lengthwise direction of the plastic zipper.

Another object of the present invention is to provide a hermetic plastic zipper of a new structure which uses the readily peelable plastic layer and which can be welded continuously by means of ultrasonic wave.

A still another object of the present invention is to provide a hermetic plastic zipper wherein a readily peelable plastic layer is welded and which is equipped with a tamper resistant function.

Means to Solve the Problems

According to the present invention, the objects are achieved by a manufacturing method of a hermetic plastic zipper wherein the plastic zipper comprises a pair of engaging portions formed on the surfaces of plastic films and has a readily peelable plastic layer prolonging in a lengthwise direction of the plastic zipper at the engaging portions or in the neighborhood thereof, the method is characterized in that while the engaging portions are brought into a engaged state, the portion of the plastic zipper where the readily peelable plastic layer exists is inserted between an ultrasonic horn and an anvil, and the readily peelable layer is welded by using ultrasonic wave under a condition wherein the distance L between the ultrasonic horn and the anvil is uniformly held at an distance of $H \geqq L \geqq 0.85H$ wherein H stands for a maximum thickness of the plastic zipper under the engaged state.

Moreover, according to the present invention, in the above-mentioned method, the objects are achieved by maintaining the ultrasonic frequency and amplitude of the ultrasonic horn at constant and moving the plastic zipper sandwiched between the ultrasonic horn and the anvil in a lengthwise direction thereof, whereby the readily peelable plastic layer is welded continuously in a lengthwise direction of the zipper. In this case, the adhesion intensity, i.e., exfoliation intensity, of the adhered portion by the readily peelable layer can be controlled by changing the velocity of the plastic zipper in a lengthwise direction of the zipper.

Moreover, it is preferred that at least one of the width of an ultrasonic horn and the width of an anvil is smaller than the open width of the female hook of the plastic zipper under the engaging state.

According to the present invention, the objects are achieved by a hermetic plastic zipper wherein the plastic zipper is formed by a pair of male and female hooks on the surfaces of the plastic films, the zipper has, inside one of a pair of the hooks, a continuous tightening wall parallel to the hook and the zipper has, inside the other hook, a continuous pressing rib parallel to the hook, respectively, and a readily peelable plastic layer is formed on at least one of the surface of the continuous tightening wall or the continuous pressing rib, characterized in that the readily peelable plastic layer is welded, and the exfoliation intensity of the welded portion is substantially uniform in a lengthwise direction of the plastic zipper.

Moreover, according to the present invention, the objects are achieved by a hermetic plastic zipper wherein the plastic zipper has a pair of engaging portions formed on surfaces of plastic films, at least one of the engaging portions has at least one projections prolonging in a lengthwise direction of the plastic zipper at least one engaging portion, the projections have flexibility at least the tip portion thereof, readily peelable plastic layer has been previously formed on the projections or on the surfaces of the other engaging portions facing to the projections, and the readily peelable plastic layer is welded. In this case, it is preferred that the flexible projection in a bending state is in contact with the surface of the other engaging portion facing to the projection, under the condition wherein a pair of engaging portions of the plastic zipper are engaging with each other and wherein the maximum thickness is indicated.

According to the present invention, the objects are achieved by a hermetic plastic zipper wherein the plastic zipper has a pair of engaging portions formed on surfaces of plastic films, at least one of the engaging portions has at least one projections prolonging in a lengthwise direction of the plastic zipper at least one flange portions, the projections have flexibility at least the tip portion thereof, a readily peelable plastic layer has been previously formed on the projections or on the surfaces of the other engaging portions facing to the projections, and the readily peelable plastic layer is welded. In this case, it is preferred that the flexible projection in a bending state is in contact with the surface of the other flange portion facing to the projection, under the condition wherein a pair of engaging portions of the plastic zipper are engaging with each other and wherein the maximum thickness is indicated. Furthermore, it is more preferred that the flexible tip portion of the projection is bent towards inside of contents side of the zipper under the condition wherein the projections are in contact with each other and wherein the maximum thickness is indicated.

According to the present invention, in the hermetic plastic zipper, wherein the plastic zipper has a pair of engaging portions formed on surfaces of plastic films, a pair of projections are formed at the mouth side of the flange, and readily peelable plastic layer has been previously formed on at least one of the projections, the readily peelable plastic layer may be welded.

Moreover, according to the present invention, the objects are achieved by a hermetic plastic zipper wherein the plastic zipper has a pair of engaging portions formed on surfaces of plastic films, a readily peelable plastic layer has been previously formed at the top of female hook or the surface of the flange portion of the male hook facing to the female hook, the hooks forming the engaging portions characterized in that the readily peelable plastic layer is welded.

Furthermore, according to the present invention, the objects are achieved by the hermetic plastic zipper, wherein the plastic zipper is provided with a slider. Additionally, a hermetic bag may be obtained by using the hermetic plastic zipper according to the present invention at the mouth of the bag.

ADVANTAGES OF THE INVENTION

According to the present invention, in a plastic zipper comprising a pair of engaging portions formed on the surfaces of plastic films and having a readily peelable plastic layer prolonging in a lengthwise direction of the plastic zipper at the engaging portions or in the neighborhood thereof, while the engaging portions are brought into a engaged state, the portion of the plastic zipper where the readily peelable plastic layer exists is inserted between an ultrasonic horn and an anvil, and the readily peelable layer is welded by using ultrasonic wave under a condition wherein the distance L between the ultrasonic horn and the anvil is uniformly held at a distance of $H \geq L \geq 0.85H$ wherein H stands for a maximum thickness of the plastic zipper under the engaged state, whereby a hermetic plastic zipper wherein exfoliation intensity is in a constant range can be manufactured.

In the above-mentioned process, the distance L between the ultrasonic horn and the anvil is uniformly held at a distance of $H \geq L \geq 0.85H$ wherein H stands for a maximum thickness of the plastic zipper under the engaged state, the ultrasonic frequency and the amplitude of the ultrasonic horn are kept at constant and the plastic zipper sandwiched between the ultrasonic horn and the anvil is moved in a lengthwise direction thereof, whereby the readily peelable plastic layer may be welded continuously in a lengthwise direction of the zipper. The adhesion intensity, i.e., the exfoliation intensity, of the adhered portion by the readily peelable layer may be controlled by changing the velocity of the plastic zipper in a lengthwise direction of the zipper, and accordingly, various controlling factors, such as frequency, amplitude, and pressurization power, etc., which have been needed in a conventional ultrasonic welding machine, are not required to be controlled.

In the plastic zipper of the present invention, the readily peelable plastic layer is welded, and the exfoliation intensity in the welded portion is substantially uniform in a lengthwise direction of the plastic zipper, and accordingly, the plastic zipper of the present invention forms a hermetic plastic zipper.

Further, according to the present invention, at least one projections prolonging in a lengthwise direction of the plastic zipper is disposed at the engaging portions of the plastic zipper or in the neighborhood thereof, the projections have flexibility at least the tip portion thereof, and a readily peelable plastic layer has been previously formed on the projections or on the surfaces of the other engaging portions facing to the projections. A hermetic plastic zipper can be obtained by welding the readily peelable plastic layer. In this case, the readily peelable plastic layer can be welded without any excessive force applied to the engaging portions since the projections have flexibility. Therefore, continuous welding can be carried out by means of an ultrasonic equipment.

If the flexible tip portion of the projection is so bent that it directs towards inside of content side of the zipper under the condition wherein the pair of projections of the zipper are in contact with each other and wherein the maximum thickness is indicated, after contents are filled in a bag which uses the plastic zipper, the welded portion does not easily peeled off even when the bag is pressurized, and air tight property can be kept.

According to the present invention, the readily peelable plastic layer has been previously formed at the top of the female hook or the surface of the flange portion of the male hook facing to the female hook, the hooks forming the engaging portions, and a hermetic plastic zipper can be obtained by welding the readily peelable plastic layer. Since the female hook itself has flexibility, the readily peelable plastic layer can be welded without applying any excessive force to the engaging portions.

A hermetic plastic zipper equipped with a slider, which can be stably opened and closed by the slider, can be obtained by fitting the slider to the plastic zipper of the present invention.

According to the present invention, a hermetic plastic zipper wherein the readily peelable plastic layer is welded has the tamper-resistant function.

THE BEST MODE FOR CARRYING OUT THE INVENTION

The present invention will now be explained in detail referring to the embodiments illustrated in the drawings. FIG. 1 is a perspective view of an example of an ultrasonic welding equipment used for manufacturing a plastic zipper of the present invention, and FIG. 2 is a sectional view taken along line A-A' of the equipment illustrated in FIG. 1, wherein the hatching lines showing the section are partially omitted, and it illustrates the state wherein an embodiment of the plastic zipper of the present invention is grasped. FIGS. 3 to 8 are sectional views of embodiments in various forms or states of the plastic zipper of the present invention, wherein the hatching lines showing the section are omitted, and wherein the hatched portions indicate the portion where readily peelable plastic layer is formed.

FIG. 3 (a) is a sectional view of an embodiment of the plastic zipper of the present invention, wherein the engaging portions of the plastic zipper are illustrated in a not engaged state. FIG. 3 (a) is a sectional view, wherein the engaging portions of the plastic zipper illustrated in FIG. 3(b) are in an engaged state. In the embodiment illustrated in FIGS. 3(a) and 3(b), a pair of male and female hooks 1-1 and 1-3 are formed on the surfaces of the plastic films F. A continuous tightening wall 1-2 which is parallel to the hook 1-1 is disposed inside one of the hooks 1-1, and a continuous pressing rib 1-4 which is parallel to the hook 1-3 is disposed inside the other hooks 1-3. The continuous pressing rib 1-4 has readily peelable plastic layer A-2 previously formed at the surface of the tip portion thereof. In this embodiment, the engaging portions are made of a pair of hooks 1-1 and rib 14. Further, the plastic zipper has projections G-1 and G-2 for fitting the slider, respectively, formed at the flange portions C-1 and C-2 located at the mouth side of the zipper so that the slider (not shown) can be fitted.

As illustrated in FIG. 3 (b), when the readily peelable plastic layer A-2 is welded to the continuous tightening wall 1-2 under a condition wherein the pair of hooks 1-1 and 1-3 are engaged with each other, a hermetic plastic zipper is obtained. In order to weld the readily peelable plastic layer A-2, the engaging portions of the plastic zipper C in an engaged state are sandwiched between the ultrasonic horn H-1 and the anvil AV-1 which are kept at a fixed distance L as illustrated in, for example, FIGS. 1 and 2. While the ultrasonic frequency and the amplitude generated by the ultrasonic horn H-1 are kept constant, the plastic zipper C is moved in a lengthwise direction thereof, i.e., in a direction indicated by the arrow in FIG. 1, the readily peelable plastic layer A-2 is melted by means of the heat generated by the ultrasonic vibration so that the continuous tightening wall 1-2 and the continuous pressing rib 1-4 can be welded continuously in a lengthwise direction of the plastic zipper. The adhesion intensity of the adhesion portion can be adjusted by changing the velocity in a lengthwise direction of the plastic zipper.

The distance L between the ultrasonic horn H-1 and the anvil AV-1 will now be explained. When the maximum thickness of the plastic zipper, which has the continuous tightening wall 1-2 and the continuous pressing rib 1-4 inside the hooks 1-1 and 1-3, respectively, as illustrated in FIG. 3(b), is set to H under the engaged state, it has been found by the inventor that the maximum flexible length, i.e., the maximum length movable by bending, in a thickness direction of the plastic zipper under the engaged state is approximately 0.15H.

Contrary to this, when the distance L is larger than the maximum thickness H, i.e., L>H, the plastic zipper C also moves in a vertical direction of FIG. 2 upon its movement in a lengthwise direction between the ultrasonic horn H-1 and the anvil AV-1, and as a result, the influence by the ultrasonic wave varies, and the readily peelable plastic layer A-2 may not be melted in a steady state, and consequently, the adhesion intensity between the continuous tightening wall 1-2 and the continuous pressing rib 1-4 becomes unstable. Moreover, since the anvil may rub the outer surface of zipper C, an outer surface gloss of the zipper may fade away or fine plastic powder detrimental to an electronic circuit etc. may be generated. Therefore, the distance L between the ultrasonic horn H-1 and the anvil AV-1 shall not be enlarged over the maximum thickness H.

Because the hook portion of the zipper may be deformed when the distance L is decreased beyond the preferable flexible range, i.e., L<0.85H, the function of the zipper cannot be maintained. Therefore, it is necessary that the distance L between the ultrasonic horn H-1 and the anvil AV-1 is in a range of H≧L≧0.85H.

Moreover, the adhesion area and the adhesive strength of the engaging portions of the zipper increase as the distance L becomes smaller than the maximum thickness H. Even if the distance L is within the flexible length range (H≧L≧0.85H) of the zipper C, the adhesion area as well as the adhesive strength of the engaging portions increases as the distance L decreases. In order to adjust the increased adhesive strength, the transfer velocity of the zipper C in a lengthwise direction may be increased, but a sliding resistance may increase as increase of the transfer velocity. When the sliding resistance increases, the zipper C tends to be deformed by the tension imposed on the zipper. Therefore, a selective range of the adhesion intensity of the zipper upon applying the ultrasonic wave of a fixed output becomes narrower as the distance L decreases. However, when the distance L is not less than 0.95H, i.e., H≧L≧0.95H, a stable adhesive strength will be obtained by controlling the velocity since the sliding resistance scarcely increases by the influence of the distance L. Therefore, the distance L between the ultrasonic horn H-1 and the anvil AV-1 is preferably in a range of H≧L≧0.95H.

In the ultrasonic welding apparatus illustrated in FIG. 1 and FIG. 2, the anvil AV-1 is connected to a height adjustable portion AV-2 so that the distance L is adjusted properly. In the height adjustable portion AV-2, it is desirable to adjust the distance L by the level of 0.01H. The distance L between the ultrasonic horn H-1 and the anvil AV-1 may be adjusted in advance using a thickness gauge (not shown) or the like.

The length Lh of the ultra sonic horn H-1, the length La of the anvil AV-1 and their configurations which are illustrated in FIG. 1 will now be explained. When the length Lh of the ultra sonic horn H-1 is long, the distance L between the ultrasonic horn H-1 and the anvil AV-1 may fluctuate in a lengthwise direction or the zipper may be expanded as the transfer speed increases due to the increase of a drawing power depending on the resistance of transfer in a lengthwise direction. This disadvantage notably occurs on the anvil when ultrasonic vibration is intermittently applied to. In order to avoid the disadvantage, it is preferred that the length Lh of the ultra sonic horn H-1 and/or length La of the anvil AV-1 is set within 50 mm. It is preferred that the edge portions in a lengthwise direction of the ultrasonic horn H-1 and the anvil AV-1 are formed in an arc shape (R=5-10 mm) so as to reduce the resistance depending on the movement. Moreover, it is preferred that the edge portions of the ultra-sonic horn H-1 and the anvil AV-1 prolonging in a lengthwise direction and being parallel to the zipper C are formed in an arc shape (R=0.1-0.2 mm) so as to prevent scratching on the outer surfaces of the zipper.

The sizes of the ultrasonic horn H-1 and the anvil of the present invention will now be explained. A definite compression force is working in the engaged state between the hook 1-1 and the hook 1-3 which are illustrated in FIGS. 3(a) and 3(b), and when the plastic zipper C is sandwiched between the ultrasonic horn H-1 and the anvil AV-1 as illustrated in FIGS. 1 and 2, the continuous pressing rib 1-4 which is in an engaged state between the ultrasonic horn H-1 and the anvil AV-1 is pressed onto the continuous tightening wall 1-2 so that the force is applied in such a direction that the tip portion of the hook 1-1 is opened and so that the hook 1-3 engaging with the hook 1-1 is pressed, and accordingly, a further compression force is applied between the hook 1-1 and the hook 1-3. When the widths of both the ultrasonic horn H-1 and the anvil AV-1 are equal to or larger than the opening width η1 of the hook 1-3 which has the continuous pressing rib 1-4, if the applied compression force is strong, ultrasonic vibration is transmitted to the hook 1-1 and the hook 1-3 without causing any substantial decrease, and as a result, the hook may be deformed or the hooks may be adhered by themselves.

In order to avoid the problems, at least either one of the width Wh of the ultrasonic horn H-1 or the width Wa of the anvil AV-1 is made into a size equal to or smaller than the opening width n1 of the hook 1-3 which has the continuous pressing rib 1-4, and it is preferred that the effective width of the ultrasonic horn H-1 and the anvil AV-1 which is obtained by excepting the arc part is made into a size equal to or larger than the width n2 of the base part of the continuous pressing rib 1-4.

Moreover, in the ultrasonic welding apparatus illustrated in FIG. 1 and FIG. 2, the sliding guides SG-1 and SG-2 for guiding the plastic zipper C are provided. Although the sliding guide SG-1 and SG-2 are important to prevent the zipper C from its horizontal swerving caused by reflection of the ultrasonic wave, type of the guides is not limited to those illustrated in FIG. 2. The ultrasonic wave used in the present invention will now be explained, the frequency and the amplitude of the ultrasonic wave are not necessarily controlled for every individual products, and a constant amplitude may be set in a range of 1-200 μm, preferably in a range of 10-50 μm. A constant frequency may be set in a range of 5-100 KHz, preferably in a range of 20-50 KHz.

While the distance L between the ultrasonic horn H-1 and the anvil AV-1 is kept at a constant in a range of H≧L≧0.85H as described above, and the plastic zipper C in an engaged state led to a fixed position by means of the guides SG-1 and SG-2 is sandwiched in a close contact state between the ultrasonic horn H-1 and anvil AV-1. The continuous pressing rib 1-4 and the continuous tightening wall 1-2 can be welded continuously by moving the plastic zipper C in a lengthwise direction as indicated by the arrow in FIG. 1 so as to melt the readily peelable plastic layer while the frequency and the amplitude of the ultrasonic are kept constant in the above-described range.

In this case, if the velocity of the plastic zipper moving in a lengthwise direction is increased while the distance L between the ultrasonic horn H-1 and the anvil AV-1 is kept constant, the adhesion intensity will be decreased and the adhesion area also will be decreased, and contrary to this, if the moving velocity is decreased, the adhesion intensity will be increased and adhesion area also will be increased. In short, the adhesion intensity or the exfoliation intensity of the adhesion portion is able to be adjusted by changing the moving velocity of the plastic zipper.

Plastic zippers illustrated in FIGS. 3(c), 3(d) and 3(e) are similar to those illustrated in FIGS. 3(a) and 3(b), respectively, so that plastic films F have a pair of male and female hooks 1-1 and 1-3 formed on the surface thereof, one of the hooks 1-1 has a continuous tightening wall 1-2 formed inside thereof and parallel thereto, and the other hooks 1-3 has a continuous pressing wall 1-4 formed inside thereof and parallel thereto, but they differ from those illustrated in FIGS. 3(a) and 3(b) in the following points.

More specifically, similar to that illustrated in FIG. 3(a), the plastic zipper illustrated in FIG. 3(c) is in a condition wherein the engaging portions are not engaged with each other, and in this embodiment, there are differences from the above-explained embodiment in that the readily peelable plastic layer A-1 is formed not only on the surface of the tip portion of the continuous pressing rib 1-4 but also on the continuous tightening wall 1-2 and that the readily peelable plastic layers A-5 and A-6 are also formed on the surfaces of the tip portions of projections G-1 and G-2 formed at the edges of the flanges C-1 and C-2.

In the embodiment illustrated in FIG. 3(d), similar to FIG. 3(b), the engaged portions are in an engaged condition, and in this embodiment, the flanges C-1 and C-2 located at the mouth sides have projections GF-1 and GH-1, respectively, at the tip portions thereof, and this embodiment is different from the above-explained embodiment in that the ends of the projections are so shaped that they are able to engage with each other.

Although the cross section of the continuous tightening wall 1-2 in the embodiment explained with reference to FIGS. 3(a) and 3(b) has a narrow root portion and a wide tip portion, the continuous tightening wall 1-2 in the embodiment illustrated in FIG. 3 (e) is different in that it has s rectangular cross section.

The cross section of the continuous tightening wall or the continuous pressing rib is not limited only to the embodiments illustrated in FIGS. 3(a) to 3(e) but may be in various cross sections as long as the readily peelable plastic layer is formed, and the hermetic plastic zipper of the present invention can be manufactured by melting the readily peelable plastic layer by means of the above-mentioned method using an ultrasonic welding apparatus.

An embodiment will now be explained referring to FIG. 4, wherein the subject to which the present invention is applied has a cross section different from that of the plastic zipper which has been explained above and which is provided with a continuous tightening wall and a continuous pressing rib inside a pair of male and female hooks, and the engaging portions are welded through the readily peelable plastic layer so that a hermetic plastic zipper is provided.

FIG. 4(a) is a cross sectional view of a universal type plastic zipper with a slider which has a pair of male and female hooks 3-1 and hook 3-2 formed on the surfaces of films wherein the hooks are in an engaged state. FIG. 4(b) is a cross sectional view wherein portions of the hooks 3-1 and 3-2 illustrated in FIG. 4(a) are separated from each other. As illustrated in FIG. 4(b), the tip portions of the hooks 3-1 and 3-2 incline in opposite directions to each other (in FIG. 4(b), the hook 3-1 is inclined upwardly, and the hook 3-2 is inclined downward), and the reference numerals x and y indicate the inclination heights of tip portions of the hooks, respectively.

In case of a conventional universal type plastic zipper, in order to disengage the engagement in an engaging state as illustrated in FIG. 4(a), a space α and a space β are needed between the tip portion of the male hook 3-1 and the bottom portion of the female hook 3-2 and between the tip portion of the female hook 3-2 and the flange section of the male hook, respectively, since the male and female hooks incline each other in opposite directions, and further it is sufficient if either one of the smaller space α or β is larger than either one of smaller inclination heights x or y, regardless of the size of the spaces α and β.

However, in such a plastic zipper as illustrated in FIG. 4(a) wherein a readily peelable plastic layer A-1 and/or A-2 is previously formed on at least one of the surfaces of the tip portion of the male hook and the bottom portion of the female hook, when the tip portion of the male hook 3-1 and the bottom portion of the female hook 3-2 are welded by melting the readily peelable plastic layer applying ultrasonic wave, the value β has to be larger than α under the engaged state of zipper, and at the same time, it has to be larger than the smaller one between x and y. It should be noted that, if β<α, the female hook 3-2 and the flange portion of the male hook will be in contact with each other before the tip portion of the male hook 3-1 and the bottom portion of the female hook 3-2 are in contact with each other, and consequently, the female hook is deformed and the function of the zipper is no longer performed since the tip portion of the female hook 3-2 and the flange portion of the male hook are welded to each other.

When the male and female hooks are welded through a readily peelable plastic layer as described above, since the tip portion of the male hook and the bottom portion of the female hook are required to be in contact with each other, the distance L between the ultrasonic horn H-1 and the anvil AV-1 becomes L≦H−α, wherein H stands for the maximum thickness of the plastic zipper under the engaged state, and the maximum welding depth becomes (H−α−L).

In this case, since the tip portion of the male hook and the bottom portion of the female hook are in contact with each other at the engaging portion of the zipper which has a thickness (H−α), and which is sandwiched between the ultrasonic horn H-1 and the anvil AV-1, there is scarcely flexibility. Therefore, when the male and female hooks are welded to each other while the plastic zipper is moved in a lengthwise direction, an error in the thickness of the zipper will directly affect an influence, and the length of (H−α) will fluctuate due to the fluctuation caused by the error, and as a result, the welding area and the welding strength will fluctuate simultaneously. Therefore, there is a disadvantage that it is difficult to peel off the engaging portion of the zipper under a stable strength. Furthermore, since exfoliation (swelling) may be caused depending on some conditions between the melted condition of the readily peelable resin by ultrasonic wave and the solidified condition by cooling, there is another disadvantage that the maintaining probability of hermetic property is also deteriorated.

Some hermetic zippers of the present invention which obviate these disadvantages are illustrated in FIGS. 4(c) to 4(f). As illustrated in FIGS. 4(c) to 4(f), at least one of the male hook 3-1 and the female hook 3-2 of the plastic zipper has one or more flexible projections 3-4 formed thereon, and either one of the male hook 3-1, the female hook 3-2 or flexible projections 3-4 has a readily peelable plastic layers A-1 and A-2 previously formed on the surface thereof. The flexible projection 3-4 may have flexibility as a whole, or it may have flexibility only at a tip portion when it is long as illustrated in FIG. 4(f).

In the plastic zipper illustrated in FIG. 4(c), the flexible projection 3-4 is formed at the tip portion of the male hook 3-1, and the readily peelable plastic layer A-1 is formed on the tip portion and projection 3-4. When the male and female hooks are in an engaged state to show H which is the maximum thickness, the tip portion of the projection 3-4 is away from the bottom portion of the female hook 3-2. This plastic zipper has projections G-1 and G-2 for fitting the slider, respectively, formed at the mouth side flanges C-1 and C-2, so that the slider can be fitted there.

In the zipper illustrated in FIG. 4 (d), there is a difference from that of FIG. 4 (c) in that the tip portion of the projection 3-4 is in contact with the bottom portion of the female hook 3-2 while the male and female hooks are engaged with each other to show a maximum thickness H.

In the zipper illustrated in FIG. 4 (e), the flexible projection 3-4 is formed inside the female hook 3-2, and the projection 3-4 has a readily peelable plastic layer A-2 formed thereon. Under the condition wherein the male and female hooks are engaged with each other and wherein the maximum thickness is H, the tip portion of the projection 3-4 is in contact with the tip portion of the male hook 3-1.

In the zipper illustrated in FIG. 4 (f), the flexible projection 3-4 is formed inside the female hook 3-2, and the readily peelable plastic layers A-1 and A-2 are formed inside the male hook 3-1 and at the tip portion of the projection 3-4, respectively. Under the condition wherein the male hook and the female hooks are engaged with each other showing the maximum thickness H under engagement, the tip portion of the projection 3-4 is in contact with the readily peelable plastic layer A-1 located inside the male hook 3-1.

The plastic zippers illustrated in FIGS. 4(c) to 4(f) become hermetic plastic zippers of the present invention, when the male hook and the female hooks under the engaged state are sandwiched between the ultrasonic horn H-1 and the anvil AV-1, the distance therebetween being kept constant, so as to melt the readily peelable plastic layers A-1 and A-2 by means of an ultrasonic wave whereby the male hook and the female hooks are welded through the projections.

It is preferred that the tip portion of the projection 3-4 is pressed to contact with the male hook or the female hook as illustrated in FIGS. 4 (c), 4(e) and 4(f) while it is inclined to the content side. When the male or female hook and the projection are welded to each other through the readily peelable plastic layer under state wherein the tip portion is inclined to the content side as described above, the welded portion will be hardly peeled off even when the pressure acts on the bag with which the zipper is equipped, namely even when the engaging portions of the zipper are exposed to the pressure from the content side, and therefore the contents such as liquid will not leak by the inner pressure. On the contrary, when the zipper is opened by a slider, the movement of the slider does not become stiff since peeling off from the mouth side can be done readily, and opening operation can be carried out easily.

The conditions concerning the distance L between the ultrasonic horn H-1 and the anvil AV-1 upon welding the plastic zipper illustrated in FIG. 4(c) will now be explained. The maximum flexure length (the maximum length movable by flexure) of the projection 3-4 illustrated in FIG. 4(c) is set to E, the distance between the tip portion of the projection and the other hook (in FIG. 4(c), the length between the tip portion of the projection 3-4 and the bottom portion of the female hook) is set to ε, the length between the tip portion of the other hook and the surface of the flange portion (in FIG. 4 (c), the distance between the tip portion of the female hook 3-2 and surface of the flange portion of the male hook) is set to β, inequality (1) has to be satisfied with.

$$\beta > (\alpha 1 + \epsilon) > \text{(the smaller one of } x \text{ or } y) \quad (1)$$

In this case, as for the distance L between the ultrasonic horn H-1 and the anvil AV-1, inequality (2) has to be satisfied with.

$$H - \alpha 1 \geqq L > H - (\alpha 1 + \epsilon) \quad (2)$$

Because the male hook and the female hook are in contact with each other through the projection forming the maximum thickness H in the engaged state in the embodiments illustrated in FIGS. 4(d) to 4(f), the embodiments are more preferable than those illustrated in FIG. 4(c). The conditions concerning the distance L between the ultrasonic horn H-1 and the anvil AV-1 upon welding of the plastic zippers will now be explained.

When the tip portion of the male hook 3-1 and the bottom portion of the female hook 3-2 are welded through the projection as illustrated in FIG. 4(e), the inequality (3), which is obtained from the inequality (1) by substituting α1=0, has to be satisfied with.

$$\beta > \epsilon > \text{(the smaller one of } x \text{ or } y) \quad (3)$$

In this case, the distance L between the ultrasonic horn H-1 and the anvil AV-1 is required to maintain a distance which satisfies with the following inequality (6). The inequality (4) is converted from the above-mentioned inequality (2) by substituted α1=0, and furthermore the inequality (5) is obtained from the condition of inequality (3).

$$H \geqq L > H - \epsilon \quad (4)$$

$$H \geqq L \geqq H - \text{(the smaller one of } x \text{ or } y) > H - \epsilon \quad (5)$$

It is empirically known that in the zippers of this type the smaller value of x or y is in a range between 0.05H and 0.15H, and therefore, the distance L holds a fixed distance L in a range of inequality (6).

$$H \geqq L \geqq 0.85H \quad (6)$$

$$H \geqq L \geqq 0.95H \quad (7)$$

It is preferred that a fixed distance L is held in a range of the above-mentioned inequality (7).

When the distance L between the ultrasonic horn H-1 and the anvil AV-1 is in a range of H≧L≧0.95H, there is no possibility that the hooks may be welded with each other, because the male hook 3-1 and the female hooks 3-2 of the zipper are not in contact with each other or compression force scarcely acts therebetween even if they are in contact with each other. Therefore, the widths of the ultrasonic horn H-1 and the anvil AV-1 need not be restricted especially. If elasticity of the projection is chosen suitably, the frictional resistance of the zipper caused by the anvil AV-1 and the ultrasonic horn H-1 will not become large, since the force of repulsion in this state by flexure of the projection also comes into a suitable range. Consequently, fluctuations in the welded area and/or the exfoliation intensity of the portion, where the tip portion of the male hook 3-1 or the bottom portion of the female hook 3-2 and the projection are welded through the readily peelable plastic layer, are small. Moreover, it is unnecessary to especially restrict the length of the anvil and the ultrasonic horn since tolerance levels of the distance L in a lengthwise direction of the zipper is wide and since the frictional resistance is small.

While the engaging portions of the plastic zipper are sandwiched between the ultrasonic horn H-1 and the anvil AV-1, the distance L of which is kept constant in a range of inequality (7), and the plastic zipper is moved in a lengthwise direction thereof under the condition wherein the frequency and the amplitude of the ultrasonic wave are fixed constant, so that the readily peelable plastic layer is melted, and so that the tip portion of the male hook and the bottom portion of the female hook are continuously welded in a lengthwise direction of the plastic zipper through the projection which is bent toward the content side, [see FIGS. 4(c), 4(e) and 4(f)], and thus a hermetic plastic zipper is obtained. The welding intensity of the welded portion may be adjusted by changing the transfer velocity in a lengthwise direction. Moreover, if the projections G-1 and G-2 for fitting a slider are provided on the mouth side of the flange C-1 and C-2, respectively, a hermetic plastic zipper that can be equipped with the slider can be obtained.

Further, the embodiments illustrated in FIGS. 4(d) and 4(f) may be welded similarly to that of FIG. 4(e) through the readily peelable plastic layer under a condition wherein the distance L between the ultrasonic horn H-1 and the anvil AV-1 is fixed constant in a range of inequality (6), preferably in a range of inequality (7).

In case of the hermetic plastic zipper illustrated in FIGS. 4(d) to 4(f), the male and female hooks can easily be welded through the readily peelable plastic layer using a conventional batch type ultrasonic welding apparatus. Generally speaking, in a conventional ultrasonic welding apparatus, a long anvil corresponding to the length of mouth of the zipper is used to weld by moving it in a vertical direction, i.e., the thickness direction of the zipper, and accordingly, there may occur a problem that an error in a moving direction of the anvil causes easily, especially when a bag body of large size is handled. Contrary to this, the embodiment of the present invention has the flexible projections formed in the engaging portion of the zipper and has a control tolerance in a range of inequality (6) as described above, consequently, the ultrasonic welding horn is able to move in a very wide tolerable range, and therefore, even in a bag body with a long width, the male and female hooks can be welded through the readily peelable plastic layer using a batch type ultrasonic welding apparatus.

FIGS. 5(a) to 5(g) are sectional views illustrating other embodiments, respectively, and they are different from the embodiment illustrated in FIG. 4, wherein the hook of the male hook is welded through the readily peelable plastic layer inside the female hook, in that in the embodiments in FIG. 5, an outer surface of the hook is welded to the flange portion through the readily peelable plastic layer.

In the embodiment illustrated in FIG. 5(a), a flexible projection 5-1 is formed at the tip portion of the female hook 3-2-1 located at the mouth side, and the projection is in contact with the flange portion C-1 located at the mouth side and facing thereto while it is bent toward the content side. Further, a readily peelable plastic layer A is previously formed on at least one of the projection 5-1 and the portion on the flange C-1 facing to the projection 5-1. When the flexure length (the maximum length movable by flexure) of the projection 5-1 is set to £, relationships similar to the above-mentioned inequalities (6) and (7) can be obtained. However, since the tip portion of the female hook 3-2-1 and the flange portion C-1 are welded in this embodiment, it is preferred that the tip portion of the female hook 3-2-1 becomes in contact with the flange portion C-1, before the tip portion of male hook 3-1 becomes in contact with the bottom portion of the female hook 3-2-1, and therefore, α>β. Moreover, since the projection 5-1 is in contact with the flange portion C-1, the flexure length E is needed to be larger than the smaller value of the inclination height of the hooks x or y.

Consequently, $$\alpha > \beta > \epsilon > \text{(the smaller value of } x \text{ or } y) \quad (1')$$

$$H \geq L > H - \epsilon E \quad (4)$$

$$H \geq L > H - \text{(the smaller value of } x \text{ or } y) > H - \epsilon \quad (5)$$

Therefore, when maximum thickness of the plastic zipper upon engagement is set to H, the distance L between the ultrasonic horn H-1 and the anvil AV-1 has the following relationships similar to those in the embodiment of FIG. 4(e).

$$H \geq L \geq 0.85H \quad (6)$$

$$H \geq L \geq 0.95H \quad (7)$$

Preferably, the ultrasonic horn H-1 and the anvil AV-1 are so kept as to maintain a constant distance L therebetween in a range of inequality (7). When the distance L between the ultrasonic horn H-1 and the anvil AV-1 is in the above-mentioned range, since main portions of the male and female hooks are not in contact with each other or pressing force scarcely acts even if they are in contact, there is no possibility that the main portions of the hooks are welded. Therefore, the widths Wh and Wa and the lengths Lh and La of the anvil AV-1 and the ultrasonic horn H-1 are not necessary to restrict especially.

In the embodiment of FIG. 5(a), the engaging portions of the plastic zipper is sandwiched between the ultrasonic horn H-1 and the anvil AV-1, the distance therebetween being kept constant, and the readily peelable plastic layer is melted by moving the plastic zipper in an engaged state in a lengthwise direction of the plastic zipper, while the frequency and the amplitude of the ultrasonic wave are kept constant, whereby the tip portion of the male hook and the flange portion are welded continuously in a lengthwise direction of the plastic zipper through the projection bent toward the content side, and thus a hermetic plastic zipper is obtained.

Further, by changing the moving velocity in a lengthwise direction, adhesion intensity of the welded portion can be adjusted. Moreover, if the projections G-1 and G-2 for fitting a slider are provided on flange C-1 and C-2 located at the mouth side, respectively, a hermetic plastic zipper which can be equipped with the slider can be obtained.

The embodiment of FIG. 5(b) is different from the embodiment of FIG. 5(a) in that the projection 5-1 is formed at the tip portion of content side of the female hook 3-2-2 and that the readily peelable plastic layer is formed on the tip portion of the projection 5-1 and on the flange located at content side facing to the projection 5-1. Other points are the same as those in the embodiment illustrated in FIG. 5(a).

The embodiment of FIG. 5(c) is similar to that of FIG. 3(a) and is a plastic zipper which has a pair of male and female hooks 1-1 and 1-3 and has a continuous pressing rib 1-4 located inside the female hook 1-1 and parallel to the hook, however, it differs from that of FIG. 3(a) in that the readily peelable plastic layer A, which has been formed on surface of the end of the continuous pressing rib 1-4 in FIG. 3(a), is formed on the tip portion of the female hook 1-3-1 located at the mouth side and the portion of the flange C-1 located at the mouth side and facing to the female hook. Further, the maximum flexure length (the maximum length movable by flexure) in the thickness direction of the plastic zipper having the continuous pressing rib 1-4 under engaged state is approximately 0.15H.

The maximum thickness of the plastic zipper under engaged state is set to H, and the clearance between the tip portion of the female hook 1-3-1 located at the mouth side and the flange portion C-1 located at the mouth side is set to $\zeta$, when the flange portion C-1 located at the mouth side and the female hook 1-3-1 located at the mouth side are welded by an ultrasonic welding apparatus, the distance L between the ultrasonic horn H-1 and the anvil AV-1 is as follows.

$$H - \zeta \geq L \geq 0.85H$$

Although the embodiment of FIG. 5(d) is different from that of FIG. 5(c) in that the flexible projection is formed at the tip portion of the female hook 1-3-1 located at the mouth side, the remaining constructions are substantially the same as those in the embodiment of FIG. 5(c). The projection 5-1, in a state bent toward the content side, is in contact with the flange portion located at the mouth side and facing to the projection. Namely, the gap $\zeta=0$. When the flange portion C-1 located at the mouth side and the female hook 1-3-1 located at the mouth side are welded to each other through the projection 5-1, the distance L between the ultrasonic horn H-1 and the anvil AV-1 is $$H \geq L \geq 0.85H.$$

The embodiments of FIGS. 5(e) and 5(f) are plastic zippers having other configurations, which use a so called theory of lever, a flexible projection 5-1 is formed at the tip portion of a projection 5-2 located at the mouth side of the engaging portions, and a readily peelable plastic layer A is formed on the projection 5-1 and/or the portion facing thereto. Also in these embodiments, if the maximum thickness of the plastic zipper in the engagement is set to H, like embodiment of FIG. 5(a), the distance L between the ultrasonic horn H-1 and the anvil AV-1 is.

$$H \geq L \geq 0.85H \quad (6)$$

$$H \geq L \geq 0.95H \quad (7)$$

Preferably, the distance L between the ultrasonic horn H-1 and the anvil AV-1 is kept constant in a range of inequality (7).

In the embodiment illustrated in FIG. 5(g), a readily peelable plastic layer is previously formed at the tip portion of the female hook 3-2-1. Although male hooks are usually not flexible in conventional zippers, the female hook 3-2-1 is often flexible. Thus, when the female hook 3-2-1 is flexible, such a flexible projection as illustrated in FIG. 5(a) may not be formed. In this case, it is necessary to set $\zeta < \alpha$ so as to prevent the male hook 3-1 and the bottom portion of the female hook 3-2 from adhering to each other before the tip portion of the female hook 3-2-1 and the male hook 3-1 facing thereto are welded. The distance L between the ultrasonic horn H-1 and the anvil AV-1 is as follows.

$$H - \zeta \geq L \geq 0.85H$$

The embodiments illustrated in FIG. 5 can be welded continuously by an ultrasonic welding machine, the ranges of control of which are $H \geq L \geq 0.85H$ as described above, and consequently, the ultrasonic horn can be moved within a sufficiently large range of error. Therefore, the female hook and the flange portion can be welded together through the readily peelable plastic layer by means of a widely used batch type ultrasonic welding apparatus, even if the width of bag is wide.

FIGS. 6(a) to 6(d) illustrate embodiments having projections, at least tip portions of which are flexible, on flange portions locating near engaging portions of zippers. FIG. 6(a) is a cross sectional view of an embodiment of a plastic zipper provided with a universal type slider, in which zipper a pair of male and female hooks 3-1 and 3-2 are formed on surfaces of plastic films and the pair of hooks are engaging with each other. In the embodiment of FIG. 6(a), a flexible projection 5-1 is formed on the flange portion C-1 of the male hook 3-1 located at the mouth side. Readily peelable plastic layers A are previously formed on the tip of projection 5-1 and on the surface of the flange portion C-2 of the female hook 3-2 located at the mouth side. It is preferred that the surface of the flange portion C-2 facing to the projection 5-1 is dented in a U-shape, and thus, a steady welding operation can be done.

In the plastic zipper of this embodiment, under the engaged state, a space α is required between the tip portion of the male hook 3-1 and the bottom portion of the female hook 3-2, and, a space β is required between the female hook 3-2 and the flange portion of the male hook, and further, the smaller value of the space α or β is larger than the smaller value of the inclination height of the hooks x or y of the hook illustrated in FIG. 4(b), regardless of the size of the spaces α and β. There is a space ζ between the flange portion C-2 of the female hook 3-2 located at the mouth side and the flexible projection 5-1, and when the flexure length (the movable length of the projection by flexure) of the flexible projection 5-1 is set to ε, the space ζ is larger than the smaller value of the inclination height x or y of the hooks. That is, assuming that β>α, there are the following relationships:

$$\beta > \alpha > \text{(the smaller value of } x \text{ or } y\text{)}$$

$$(\zeta + \epsilon) > \text{(the smaller value of } x \text{ or } y\text{)} \quad (1'')$$

In this embodiment, the distance L between the ultrasonic horn H-1 and anvil AV-1, upon welding the flexible projection 5-1 and the flange portion C-2 located at the mouth side by melting the readily peelable plastic layer A, will now be explained. First of all, when the plastic zipper is grasped between the ultrasonic horn H-1 and anvil AV-1, it is necessary that the flexible projection 5-1 and the female hook 3-2 become in contact before the other remaining parts are in contact, and accordingly, the distance; is required to be smaller than the smaller value of α or β

$$(\alpha \text{ and } \beta) > \zeta$$

When the maximum thickness of the zipper under the engaged state is set to H, the distance L between the ultrasonic horn H-1 and the anvil AV-1 is needed to be a constant value in a range which satisfies with $$H - \zeta \geq L > H - \alpha \quad (2')$$

and (H−α−L) indicates the maximum depth of welding.

In this case, the flexure length of the flexible projection 5-1 (the movable length of the projection by flexure) is set to E, the distance may be maintained so as to satisfy the following range.

$$H - \zeta \geq L > H - (\zeta + \epsilon) \quad (4')$$

$$H - \zeta \geq L \geq H - \text{(the smaller one of } x \text{ or } y\text{)} > H - (\zeta + \epsilon) \quad (5')$$

It is empirically known that in the zippers of this type the smaller value of x or y is in a range between 0.05H and 0.15H, and the distance L holds a fixed distance L in a range of $$H - \zeta \geq L > 0.85H \quad (6')$$

When the projection 5-1 does not have flexibility, since the depth of the welding is L−(H−ζ) if the distance between the ultrasonic horn H-1 and the anvil AV-1 is set to L, an error in the size of the depth of zipper affects directly upon welding the projection and the flange portion of the plastic zipper by moving the plastic zipper in a lengthwise direction. The deviation caused by the error increases the sliding resistance or fluctuates welding area, and accordingly, it is difficult to maintain uniform adhesion intensity. As a result, peeling operation by a slider becomes unstable. Furthermore, since exfoliation (swelling) may be caused by conditions of the readily peelable resin from the molten state by ultrasonic wave to the solidified state by cooling, therefore, there is a disadvantage that maintaining probability of the hermetic performance is deteriorated.

In the embodiment illustrated in FIG. 6(b), the female hook 3-2 has the projection 5-1 at the flange portion C-2 located at the mouth side thereof, the tip portion of which is flexible and the flexure length (the movable length of the projection by flexure) of which is E. The tip portion of the projection 5-1, which is bending towards the content side, is in contact with the flange portion C-1 of the male hook 3-1 located at the mouth side and facing to the projection, the readily peelable plastic layers A are previously formed on the surfaces of the portions. The other remaining constructions are same as those described with reference to FIG. 6(a).

In this embodiment, in the condition wherein the plastic zipper is under the engaged state and shows the maximum thickness H, ε is required to be smaller than α and β and larger than smaller value of x or y.

In this embodiment, because the space ζ in the above mentioned inequality (6') is ζ=0, the distance L between the ultrasonic horn H-1 and the anvil AV-1 has to maintain a fixed distance L in a range of the inequality (6).

$$H \geq L \geq 0.85H \quad (6)$$

$$H \geq L \geq 0.95H \quad (7)$$

Preferably, the distance L is maintained at a constant in the range of inequality (7). In this case, no special restriction is imposed on the width or the length of the ultrasonic horn H-1 or the anvil AV-1.

The embodiment illustrated in FIG. 6(c) is differ from that of FIG. 6(b) in that the flexible projection 5-1 is formed on the flange portion of the female hook located at the contents side, and the other remaining constructions are the same as those described with reference to FIG. 6(b).

The embodiment illustrated in FIG. 6(d) differs from that of FIG. 6(b) in that two flexible projections 5-1-1 and 5-1-2 are so formed, respectively, that they face to the flange portion C-1 of the male hook 3-1 located at the mouth side and the flange portion C-2 of the female hook 3-2 located at the mouth side, one of the tip portions of the projections being formed in a convex shape and the other being formed in a concave shape, and each of which has a readily peelable plastic layer A formed on the surface thereof, and the other remaining constructions are the same as those described with reference to FIG. 6(b). When the projection 5-1-1 and the projection 5-1-2 are welded, the shapes of tip portion of projections are made in convex and concave, respectively, as illustrated in FIG. 6(d) so that they are stably in contact with each other even when they are accompanied with ultrasonic vibration.

Also in embodiment of FIG. 6(c) or 6(d), when the readily peelable plastic layer A is melted by means of a ultrasonic welding apparatus, similarly to the embodiment illustrated in FIG. 6(b), the distance L between the ultrasonic horn H-1 and the anvil AV-1 is maintained at constant in a range of inequality (6).

$$H \geq L \geq 0.85H \quad (6)$$

$$H \geq L \geq 0.95H \quad (7)$$

Preferably, the distance L is maintained at constant in the range of inequality (7).

The portion of the zipper where the projection illustrated in FIGS. 6(a) to 6(d) is formed is sandwiched between the ultrasonic horn H-1 and the anvil AV-1, which are maintained at a constant distance as described above, when the plastic zipper in an engaged state is moved in a lengthwise direction thereof while the frequency and the amplitude of the electronic wave is maintained constant, the tip portion of the projection and the flange portion, or the projection and the projection, are welded continuously in the lengthwise direction of the zipper by melting the readily peelable plastic layers, and thus, a hermetic plastic zipper is obtained. Further, the adhesion intensity of the welded portion can be adjusted by changing the transfer speed in a lengthwise direction. Moreover, if the flange portions C-1 and C-2 located at the mouth side of the zipper are provided with projections G-1 and G-2, respectively, for fitting a slider, a hermetic plastic zipper which is able to be equipped with the slider is obtained.

Especially, when the projection provided at the engaging portion, or at the flange portion located at the mouth side or content side, is welded to the flange portion or the like through the readily peelable plastic layer while it is bent towards content side as illustrated in the embodiments of FIGS. 5(a), 5(b), 5(d) to 5(g) and FIGS. 6(b) and 6(c), since the welded portion is hardly peeled off by inner pressure from the inside of the bag, the contents of the bag such as liquid never leaks by the inner pressure. Moreover, when the zipper is opened by a slider, the movement of the slider does not become stiff since peeling off from the mouth side can be done readily, and opening operation can be carried out easily.

When such a projection is welded to the flange portion or the like through the readily peelable plastic layer while it is bending towards the content side, the ultrasonic horn can be moved in a sufficiently wide range of error, and therefore, even if a bag has a long width, the male hook portion and the female hook portion are welded easily through the readily peelable plastic layer using a universal batch type ultrasonic welding apparatus, and thus, a hermetic plastic zipper is obtained.

FIG. 7 is a cross sectional view of an embodiment wherein the flange portions of the male and the female hooks of the plastic zipper located at the mouth side are provided with the projections G-1 and G-2 for fitting the slider. The configuration of the engaging portion of the plastic zipper illustrated in FIG. 7 is the same as those illustrated in FIGS. 3(a) and 3(b), and the engaging portion is welded through the readily peelable plastic layer A-2, and the maximum width of the engaging portion is H. The flange portion C-1 of the male hook 1-1 of the plastic zipper located at the mouth side and the flange portion C-2 of the female hook 1-3 located at the mouth side are provided with the projections G-1 and G-2, respectively. The tip portion of the projection G-1 is formed in a convex shape, and the tip portion of the projection G-2 facing to the projection G-1 is formed in a concave shape, and both the projections maintain a distance $\zeta$ therebetween, and the tip portion of the projection G-1 is flexible and has the readily peelable plastic layer previously formed thereon. The flexure length (the movable length of the projection by flexure) of the tip portion of the projection G-1 is set to E.

The methods for welding both the projections G-1 and G-2 through the readily peelable plastic layer will now be explained. First of all, the engaging portions of the plastic zipper are welded to each other in the above-described method. Then, the projections G-1 and G-2 of the plastic zipper, the engaging portions of which have been welded; are sandwiched between the ultrasonic horn H-1 and the anvil AV-1, which are maintained at a constant distance. Under this condition, while the frequency and the amplitude of the ultrasonic wave are maintained at constant, the engaged plastic zipper is moved in a lengthwise direction thereof, so that the readily peelable plastic layer A formed on the surface of the projection G-1 is melted. Thus, the projections G-1 and G-2 can be welded continuously through the readily peelable plastic layer A in a lengthwise direction of the plastic zipper. The adhesion intensity (peeling off intensity) of the welded portion can be adjusted by changing the moving velocity in a lengthwise direction.

The distance L in this case may be in the following range.

$$(H-\zeta) \geq L \geq (H-\zeta-\epsilon)$$

Further, although in the embodiment illustrated in FIG. 7, the shapes of the tip portions of projections G-1 and G-2 are convexed and concaved so that they can be welded stably relative to the ultrasonic vibration, they are not limited to these shapes. Furthermore, in order to stably weld the projections G-1 and G-2 by ultrasonic vibration, either one of the projection G-1 or G-2 is flexible. Although the tip portion of the projection has been flexible in the above-explanation, the projection as a whole may have flexibility.

It is convenient for a hermetic plastic zipper of the present invention that it is provided with a slider and that the adhesion through the readily peelable plastic layer is peeled off by the slider. When the adhesion through the readily peelable plastic layer is performed inside the female hook as illustrated in FIG. 3 or FIG. 4, movement of the slider from the closed position toward the open position of the zipper disengages the engagement of the hooks and peels off the adhered portion, and the zipper is opened.

When the female hook and the flange portion of the zipper are sealingly adhered through the readily peelable plastic layer as illustrated in FIG. 5, or when the projection formed on the flange portion and the flange portion facing to the projection are sealingly adhered through the readily peelable plastic layer as illustrated in FIG. 6, movement of the slider from the closed position toward the open position of the zipper disengages the engagement of the hooks and peels off the adhered portion, and the zipper is opened.

With reference to FIG. 8 and FIG. 9, the operation of some embodiments of the plastic zipper, provided with a slider, of the present invention will now be explained. FIG. 8 is a diagrammatical perspective view of a bag equipped with a plastic zipper with a slider of the present invention, a part of which, i.e., the plastic zipper part, is cut off, FIG. 9(a) is a sectional view corresponding to the section taken along line A-A' in FIG. 8, and FIG. 9(b) is a sectional view corresponding to the section taken along line B-B' in FIG. 8.

When a slider is installed on the plastic zipper in a sealed condition of the present invention, the slider S is installed at a position, which is referred to as "the closed end of the zipper" and which is illustrated as "E1" in FIG. 8, where the zipper which is equipped with a bag is entirely closed. When a customer tries to take out contents from the bag, which has the plastic zipper of the present invention attached with the mouth thereof, the plastic zipper is opened first. Namely, the zipper is entirely opened by moving the slider along the zipper from the closed end E1 of the zipper, and the slider S is continued to open until it reaches a position, which is referred to as "the open end of the zipper", which is illustrated as "E2" in FIG. 8 and which is opposite to the closed end of the zipper, where the zipper which is equipped with a bag is entirely opened.

Referring to FIG. 8, a structure of the slider S will now be explained briefly. The top of the slider S is formed in a rectangular shape and has an opening pillar S5 hanging down from one end of the surface thereof, i.e., at the right end of FIG. 8, and when FIG. 8 is seen from above, an opening guide S2, which is formed in such a wedge shape that it has a pointed end (S1 in FIG. 9) at the left side and that it is expanded towards the right side, is so connected to the bottom portion of the opening pillar S5 that it is parallel to the surface of the top. As illustrated in FIG. 9(b), a groove S4, which is parallel to the opening guide S2, is formed above the opening guide S2 of the slider S, and a lid S3, covering the opening of the connecting groove S4, is disposed from the opening pillar S5 to the portion above the opening guide S2.

The plastic zipper of this embodiment of the present invention, as illustrated in FIG. 9 (a), has a continuous pressing rib 1-4, and under the sealed state, the tip portion of the female hook 1-3-1 located at the mouth side and the flange portion C-1 of the male hook located at the mouth side and facing to the tip portion are welded through the readily peelable plastic layer A. Although in FIG. 8, the tip portions of the flange portions C-1 and C-2 located at the mouth side have projections GF-1 and GM-1, which are engagable with each other like the embodiment illustrated in FIG. 3(d), formed thereon, in FIG. 9, projections G-1 and G-2 for guiding slider are disposed.

In FIG. 9 (a), the tip portion S1 of the opening guide S-2 is positioned between the female hook 1-3-1 located at the mouth side and a pair of projections G-1 and G-2 for guiding the slider. The end S1 of the opening guide S2 is narrow, and it does not deform the flange portions C-1 and C-2 located at the mouth side of the zipper. Further, an inner wall of the upper portion S3 of the slider does not touch the projections G-1 and G-2 for guiding the slider.

When the slider S moves from the closed end E1 toward the opening end E2 of the zipper, the projections G-1 and G-2 for the guiding the slider are restrained by the groove S4 formed at the upper portion S3 of the slider S as illustrated in FIG. 9(b) and at the same time, the plate portion S2 of the opening guide spreads out the flange portions C-1 and C-2. Therefore, the welded portion welded through the readily peelable plastic layer A is peeled off, the male and the female hooks are disengaged, and thus, the zipper becomes in an unsealed condition.

Contrary to this, when the slider S is moved from the opening end E2 to the closed end E1 of the zipper, the zipper is fully re-closed but the readily peelable plastic layer A, which has been peeled off as described above, is left being exfoliated. Thus, the zipper in an unsealed condition can be easily judged.

Furthermore, FIG. 9(e) is a cross sectional view explaining the structure which annuls the opening force generated by the opening guide of the slider S positioned at the closed end E1 of the zipper, and the slider S positioned at the closed end E1 of the zipper is cross sectioned along B-B' in FIG. 8 similar to FIG. 9 (b). Namely, slits SL-1 and SL-2 are formed at the flange portions C-1, C-2 of the zipper located at the mouth side, at positions which correspond to the opening guide S2 of the slider S when the slider S is positioned at the closed end E1 of the zipper. The opening force of the opening guide S2 becomes ineffective due to the extension, caused by slits SL-1 and SL-2, of the flange portions C-1 and C-2 located at the mouth side, and the zipper is prevented from accidental opening by means of the opening guide S2 at the opening end of the zipper.

Therefore, when the zipper is not open yet, the slider S is in the closed position E1 of the zipper, the welded portion through the readily peelable plastic layer A between the tip portion of the female hook 1-3-1 of the zipper and the flange portion C-1 of the male hook located at the mouth side has not been peeled off yet as illustrated in FIGS. 9(a) and 9(e), and the sealed condition is maintained. Consequently, the welded portion through the readily peelable plastic layer A keeps welded state unless the slider S is slid from the closed end E1 towards the open end E2 of the zipper, and the zipper can keep its sealed condition.

FIG. 9(c) is a cross-sectional view, similar to FIG. 9(a), and shows another plastic zipper of the present invention fitted with a slider in a sealed state, and FIG. 9(d) is a cross sectional view similar to FIG. 9(a) of this embodiment. In the zipper of this embodiment, the projection 5-1 formed on the flange portion C-2 located at the mouth side near the female hook, in the zipper illustrated in FIG. 6 (b), is welded to the flange portion C-1 facing to the projection 5-1 through the readily peelable plastic layer A.

When the slider S is in the closed end of the zipper, as illustrated in FIG. 9(c), the tip portion S1 of the opening guide is positioned between the projection 5-1 and a pair of projections G-1 and G-2 for guiding the slider. Similar to FIG. 9(a), the tip portion S1 of the opening guide has a narrow width, and it does not deform the flange portions C-1 and C-2 located at the mouth side. Further, an inner wall of the upper portion S3 of the slider S is not in contact with the projections C-1 and C-2 for guiding the slider. Therefore, when the slider S is in the closed end of the zipper, as illustrated in FIG. 9(c), the welded portion welded through the readily peelable plastic layer A is not peeled off, and thus the zipper can keep in a sealed condition.

In FIG. 9(d), similar to FIG. 9(b), the projections G-1 and G-2 for guiding the slider are restrained by the groove S4 formed at the upper portion S3 of the slider, and at the same time, the plate portion S2 of the opening guide spreads out the flange portions C-1 and C-2 located at the mouth side.

Therefore, when the slider S is slid from the closed end of the zipper towards the open end of the zipper, the welded portion welded between the projection 5-1 and the flange portion C-1 through the readily peelable plastic layer A is peeled off, and the engagement between the male and female hooks 3-1 and 3-2 is disengaged, and thus the zipper becomes in an open state.

In the above-mentioned embodiments of the present invention illustrated in FIG. 3 to FIG. 7, it is not easily to recognize whether it is opened or not when the welded portion is located inside the female hook as illustrated in FIG. 3 and FIG. 4, however, when the projection formed outside the female hook or at the flange portion as illustrated in FIG. 5 and FIG. 6 is the welded portion, especially in the latter case, the unsealing of the zipper can be detected by the external view, because if the zipper is once opened, the welded portion is kept separated even if the zipper is closed again. Namely, it has detection function of broken seal. Thus it has the tamper evidence function.

The construction of the slider is not limited to the embodiment illustrated in FIG. 8, and it may be provided with a projection at position near the mouth side from the engaging portion, and the projection and a position facing to the projection may be welded as illustrated in FIGS. 6(a), 6(b) and 6(d). Furthermore, the method of peeling off the welded portion and method of opening and closing the engaging portion may be performed by a slider or may be performed manually without using a slider. Furthermore, a slider only used for closing may be provided, and the zipper is opened manually and is closed by the slider.

The plastic zipper of the present invention is usually applied to the taking out mouth of a bag as explained in the background art. When the durability against the internal pressure of the bag (the characteristics that do not open even if internal pressure of the bag increases) is regarded as important, it is preferred that such zippers provided with sliders as disclosed in patent documents 1 to 4 which have itself strong opening intensity from the content side of the bag are used. When the welding of the present invention through the readily peelable plastic layer at the engaging portion or at its neighborhood is carried out in such a zipper as described above, not only the sealing ability but also the adhesion intensity of the readily peelable plastic layer are added to the durability against the internal pressure of the zipper itself, and the durability against the internal pressure is further increased.

When a projection is formed at a position located near the mouth side and away from the engaging portion, and when the projection and the flange portion are welded through the readily peelable plastic layer, such a plastic zipper of the present invention also has high durability against the internal pressure because the pressure from the bag body is once caught by the engaging portion of the zipper, and because only the weakened pressure is transferred to the welded portion.

In the embodiment illustrated in FIG. 6(c), the projection is formed at a position away from the engaging portion of the zipper toward the content side, and because the projection and the flange portion are welded through the readily peelable plastic layer, pressure from the bag body is applied directly to the welded portion. Accordingly, such an embodiment may be used for a bag wherein the durability against the internal pressure is regarded as not important. In this case, the durability against the internal pressure will be increased when the projection is in contact with the flange portion located at the content side while it is bending towards the content side than when the projection is bending towards the mouth side.

The seal proof of the plastic zipper which can be fitted with a slider by means of the readily peelable plastic layer like the present invention is very important to guarantee the shelf life of goods which are packed into a bag fitted with the zipper and the slider.

The readily peelable plastic layer used in the present invention will now be explained. A plastic layer which has peeling intensity measured by the method of JISZ0238 of less than 0.6 kgf/15 mm is usually called as a readily peelable plastic layer, and the peeling intensity may vary depending on the heat sealing temperature. A universally used readily peelable plastic layer (for example, those disclosed in Japanese Patent Application Laid-open Nos. Hei 5-214228, Hei 10-204413) is devised so as not to change its peeling intensity more than 0.5 kgf/15 mm even if heat sealing temperature varies 30 to 40° C. (which will be referred to as a universally used readily peelable plastic layer hereinbelow). Thus, when a universally used readily peelable plastic layer is used to heat seal, a stable peeling intensity can be maintained even if heat sealing temperature varies somewhat. Accordingly, such a universally used readily peelable plastic layer may be used in the present invention.

Furthermore, it is surprising that the present invention does not require to use a universally used readily peelable plastic though it welds complicated configuration. The present invention can use resin which usually cannot use as a readily peelable plastic (for example, such resin that sharply change the peeling intensity to extent of 4 Kgf/15 mm by temperature difference of 20° C. and it needs to be controlled the heat sealing temperature within 104±0.3° C. in order to maintain the peeling intensity within a range of 0.6 Kgf/15 mm which is the range for usual readily peeling) as a readily peelable plastic layer of the present invention. A stable peeling intensity can be maintained even when such plastics are used. Although the reason therefor is uncertain, it seems to us that the structure of the zipper specified in the present invention has stabilized the heat generating condition by ultrasonic vibration.

As a specified example of the present invention, a case wherein the engaging portion of the plastic zipper formed in a tape shape is welded continuously in a lengthwise direction of the zipper will now be explained with reference to FIG. 10.

First of all, the tape shaped zipper T, the engaging portions of which are not welded but which are in an engaging condition, is withdrawn from a reel 6-1, is passed through the ultrasonic portion via a tension control roll 6-2. Namely, after the tension of the tape shaped zipper T is controlled at constant, the tape shaped zipper is passed through a portion between the ultrasonic horn H-1 and the anvil AV-2 which maintain a constant distance therebetween as illustrated in FIG. 1 and FIG. 2. The ultrasonic horn H-1 is connected to the booster B and the converter C through the connector H-2, whereby ultrasonic vibration having a constant frequency and an amplitude is transmitted to the ultrasonic horn H-1.

Further, according to the present invention, in order to control adhesion intensity of the zipper, it is basically required to change moving velocity of the tape shaped zipper while output of ultrasonic vibration is maintained at constant, however the present invention does not deny to adjust the adhesion intensity of the zipper.

The anvil AV-1 can finely adjust the distance (FIG. 2) between the ultrasonic horn H-1 and the anvil AV-1 by means of its finely height adjusting portion AV-2, and the distance L has been previously adjusted to that decided upon zipper design using a thickness gauge and so on. The zipper passed through the clearance between the ultrasonic horn H-1 and the anvil AV-1 is withdrawn at a constant speed by means of take-up roll 6-3. The readily peelable plastic layer is melted by means of heat generated by ultrasonic vibration at a position between the ultrasonic horn H-1 and the anvil AV-1, the engaging portions of the plastic zipper are welded with each other in a lengthwise direction of the zipper, and the welded tape shaped plastic zipper is wound onto a reel 6-5 through a dancer roll 6-4.

On this occasion, the distance between the ultrasonic horn H-1 and the anvil AV-1 is kept constant, when the withdrawal speed of the plastic zipper is increased, the adhesion area and the adhesion intensity of the portion of the zipper which has been welded through the readily peelable plastic layer of the engaging portion are decreased, and when the withdrawal speed, the adhesion area and the adhesion intensity are increase.

The relationship between the opening intensity and the withdrawal speed of the plastic zipper wherein the engaging portions are welded through the readily peelable plastic layer will now be explained. When the welding position of the engaging portions is the same, as the adhesion intensity increases, the opening intensity of the plastic zipper correspondingly increases. However, when different adhesion intensities are distributed due to the welded positions of the engaging portions of the zipper, the opening intensity of the plastic zipper is determined by the adhesion intensity at position where the peeling off starts. The reason therefor is that once peeling off starts, stress is concentrated at the peel off point, and therefore, the peel off continues easily even if the peeling strength at the position other than the peeling off starting point is a little bit strong or weak.

For instance, withdrawal speeds are plotted on abscissa and opening intensities are plotted on ordinate, not a simple downward sloping curve but a maximum value or a minimum value may be observed sometimes depending on the configurations of the engaging portions. It is presumed that the point where peeling off starts varies depending on the variation of the speed and that at the same time, the adhesion intensity there varies, and accordingly, the maximum value or the minimum value is generated. A stable opening intensity may be maintained when the welding operation is done at a speed around the maximum value or the minimum value.

Economical aspect upon continuous welding will now be explained in comparison with a universal batch type ultrasonic welding apparatus. The batch type welding method described here means a method of welding wherein the welding operation is divided into a plurality of steps and the divided steps are performed intermittently. In case of a batch type ultrasonic welding using universal ultrasonic, elements which take parts in control of the welding are: (1) control on frequency and amplitude; (2) control of the ultrasonic vibration applying time; (3) control of the transfer speed of ultrasonic horn; (4) control of the transfer distance of the ultrasonic horn; (5) control of the compression force between the ultrasonic horn and the anvil; and (6) alternation of the configuration of the ultrasonic horn, the booster and the converter depending on the length of the bag body. In short, there are a lot of elements which may decide the size of the welding or a condition of the welding. In order to totally control these elements, a complicated control circuit and a various kinds of attachment devices are required, and the equipment cost becomes expensive. A universal batch type ultrasonic welding apparatus has an advantage that it can weld a various objects, and on the contrary, it has disadvantages that its equipment is expensive and that its productivity is inferior.

Contrary to this, the continuous welding of the present invention has advantages: (1) the welded portion is continued for a long distance; (2) the area and the peeling intensity of the welded portions are stable; (3) productivity is preeminent because of the continuous production; (4) costs for maintaining accuracy and maintenance of the apparatus are not expensive since a main part of the welding apparatus includes no rotational parts though it is operated continuously; and (5) it differs from a batch type ultrasonic welding apparatus in that it does not require a control equipments for mutually control, i.e., control of frequency, adjustment of application time, stop position of the ultrasonic horn and distribution of transfer velocity, and the ultrasonic apparatus requires only transmitting unit, and accordingly, the cost required for the ultrasonic apparatus is sharply reduced.

The process for installing an embodiment of the present invention to a bag body will now be explained with reference to FIG. 10 and FIG. 11. Such a tape shaped plastic zipper as illustrated in FIGS. 3(*a*) and 3(*b*), which has a continuous tightening wall 1-2 inside one of hooks 1-1 and which has a continuous pressing rib 1-4, having a readily peelable plastic layer A-2 on the surface thereof, inside the other hook 1-3 and which has projections G-1 and G-2, respectively, on the flange portions C-1 and C-2 of the hooks located at the mouth side, is withdrawn from a reel 6-1 illustrated in FIG. 10 while it is in an engaged state. Then, the plastic zipper C under the engaged state is sandwiched between the ultrasonic horn H-1 and the anvil AV-1, which form a constant distance therebetween, and while the frequency and the amplitude of the ultrasonic wave are maintained constant, the zipper is transferred in a lengthwise direction of the zipper by means of a take-up roll 6-3, the speed of which is controlled. In this occasion, the readily peelable plastic layer is melted by the ultrasonic wave, the continuous tightening wall and the continuous pressing rib are welded through the readily peelable plastic layer, and a hermetic plastic zipper of the present invention is continuously produced, and it is wound up onto a roll 6-5.

The hermetic zipper wound onto the roll 6-5 is installed on a zipper roll X2 illustrated in FIG. 11(*a*). In FIG. 11(*a*), after the film withdrawn from the film roll X-1 and constituting a bag body is folded in half by a triangular plate X3, it is supplied to a bag manufacturing machine through a dancing roll X4. On the other hand, after the hermetic zipper is drawn from the zipper roll X-2 and is set at the predetermined position on the bag constituting film, the flange portion of the zipper located at the content side is welded to the bag constituting film by means of heat sealing machines X5 and X6.

Thereafter, the break preventing processing of the seal such as formation of cut is performed at a predetermined position located at the closed end on of the zipper by means of a zipper closed end processing apparatus X7, and after the end position of the zipper is point sealed by means of an ultrasonic heat sealing apparatus X9, slider is installed on the position where the break preventing processing has been done by means of an automatic slider installing apparatus X8. In this occasion, the slider is supplied with from the automatic slider supply machine X81. Then, after the end portion of the zipper and the film portion of the bag body are heat sealed in a direction perpendicular to the zipper, by means of a vertical heat-sealing machine X10, the heat sealed portion at the end portion of the zipper is cut off by a guillotine cutter X12, and thus, a hermetic bag X13 provided with a plastic zipper wherein the engaging portions are welded through the readily peelable plastic layer and which is equipped with the slider can be produced.

A melt cutting and sealing machine may be used at the position of the guillotine cutter X12 in place of the vertical heat sealing machine X10 and the guillotine cutter X12.

The present inventor has previously explained the automatic slider installing method in detail in Japanese Patent Application No. 2003-000215.

FIG. 11(*b*) is a process diagram showing an embodiment wherein the installation order of the slider exemplified in FIG. 11(*a*) is changed. Such a zipper as illustrated in FIGS. 3(*a*) and 3(*b*) is wound onto the roll 6-5 as a hermetic zipper of the present invention in accordance with the process illustrated in FIG. 10. The roll 6-5 is set on the zipper roll W2 illustrated in FIG. 11(*b*).

The hermetic zipper is withdrawn from the zipper roll W2, and then, the break preventing processing, such as cutting, is carried out at a predetermined position on the zipper at the closed end thereof by means of a zipper closed end processing apparatus W7, and after the end portion of the zipper, except for the position where the tape shaped zipper is welded to the film, is point sealed using a ultrasonic heat sealing machine W9, the slider is installed at the position where the break preventing processing of the seal has been applied by means of an automatic slider installing machine W8. In this occasion, the slider is supplied from the automatic slider supply machine W81. Then, a hermetic plastic zipper tape provided with the tape shaped slider wherein the engaging portions are welded through the readily peelable plastic layer is obtained.

On the other hand, the film which will constitute the bag body and which is withdrawn from the film roll W1 is folded in half by a triangular plate W3, and it is supplied with the bag manufacturing machine through the dancing roll W4.

Then, after the hermetic zipper provided with the tape shaped slider wherein the engaging portions are welded is fitted on a predetermined position on the film for the bag body folded in half, it is welded to the film for the bag body by means of heat sealing machines W5 and W6. Thereafter, after the end portion of the zipper and the film portion of the bag body are heat sealed in a direction perpendicular to the zipper by means of a vertical heat sealing machine W10, the heat sealed portion located at the end portion of the zipper is cut off by means of a guillotine cutter W12, and thus a product, i.e., a bag body W13 fitted with a hermetic plastic zipper provided with a slider wherein the engaging portions are welded through the readily peelable plastic layer can be produced.

The bag body equipped with the hermetic zipper with the slider which is manufactured in accordance with FIGS. 11(a) and 11(b) has no contents packed therein, however, the contents may be packed from an unsealed position, for example, from an unsealed position on the other flange which has not been welded (not sealed) among a pair of flanges, wherein only one flange is welded (sealed) to the film correspondingly to the engaging portions, and then the position may be sealed.

Referring to FIG. 12, a process for continuously manufacturing bags including a packing process of the contents will now be explained wherein a hermetic plastic zipper of the present invention is incorporated, the engaging portions of which are welded through a readily peelable plastic layer, and which is provided with a slider. The hermetic zipper of the present invention is wound onto the roll 6-5 by the process explained with reference to FIG. 10. It is set on the zipper roll Y3 in FIG. 12

Two films which will constitute the bag body and which are withdrawn from the film rolls Y1 and Y2 are supplied with the bag manufacturing machine through the dancing roll Y4. On the other hand, the hermetic zipper is withdrawn from the zipper roll Y3, and after it is set at a predetermined position on the films, then the zipper is welded to the films by means of the heat sealing machines Y5 and Y6.

Successively, the break preventing processing of the seal, such as formation of cutting, at a predetermined position on the zipper at the closed end is carried out by means of the zipper closed end processing apparatus Y7, and after the end portion of the zipper is point sealed by means of the ultrasonic heat sealing machine Y9, the slider is installed at the position where the break preventing processing of the seal has been carried out by means of the automatic slider installing machine Y8. On this time, the slider is supplied from the automatic slider supply machine Y81.

Depending on necessity, the heat sealing bar in the heat sealing machine Y10 may be intermittently used so that the projection at the upper portion of the zipper for preventing illicitly breaking of the seal is welded through the readily peelable plastic layer, or it is sealed by the labeling machine Y11.

After the end portion of the zipper and the film portion of the bag body are heat sealed in a direction perpendicular to the zipper by means of the vertical heat sealing machine Y12, the contents are filled in the bag from the bottom portion of the bag by means of the filling machine Y14. Then, after the bottom portion is sealed by the heat sealing machine Y15, the heat sealed portion located between the end portion of the zipper and the film for bag is cut off by means of the guillotine cutter Y16, and thus, the product, i.e., the bag body Y17 equipped with the hermetic plastic zipper fitted with the slider, wherein the engaging portions are welded through the readily peelable plastic layer and which is filled with the contents can be produced.

The set up position of the vertical heat sealing machine Y12 is not limited to the position illustrated in FIG. 12, and it may be positioned between the ultrasonic heat sealing machine Y9 and the automatic slider installing machine Y8.

With reference to FIG. 13, the process for intermittently carrying out the bag manufacturing method by installing the hermetic plastic zipper of the present invention wherein the readily peelable plastic layer is formed at the projections for slider like the zipper illustrated in FIG. 7. First, according to the process explained with reference to FIG. 10, the hermetic zipper of present invention wherein the engaging portions are welded is wound onto the roll 6-0.5. Then, it is set on the zipper roll V2 in FIG. 13.

On the other hand, after the film which will constitute the bag body and which is withdrawn from the film roll V1 is folded in half by means of the triangular plate V3, it is supplied with the bag manufacturing machine through the dancing roll V4.

After the hermetic zipper withdrawn from the zipper roll V2 is set at a predetermined position on the film, the zipper is welded to the film by means of a heat sealing machines V5 and V6.

Thereafter, the film is transferred intermittently in such a manner that the projections G-1 and G-2 located at the mouth side of the zipper is positioned between the ultrasonic horn and the anvil of the ultrasonic welding apparatus V7. In the ultrasonic welding apparatus V7, the ultrasonic horn intermittently reciprocates vertically in a direction perpendicular to the zipper fitted to the bag body, and when the ultrasonic horn is at the lowest position, the distance between the anvil becomes L, and when the ultrasonic horn is at the highest position, the distance is so set that it maintains twice the maximum width H of the zipper. By means of this ultrasonic welding apparatus V7, the projections G-1 and G-2 of the zipper located at the mouth side wherein engaging portions have been welded are welded by melting the readily peelable plastic layer. This welding is done intermittently. Now the process will be explained in detail, marks printed on the film are read by a photo-electric tube, and at a predetermined position, intermittent vertical movement of the ultrasonic horn is performed for a predetermined length, and at a predetermined position at the closing end of the zipper, the distance between the anvil and the ultrasonic horn is set to 2H so that the projections are not welded to each other, while at the remaining positions, the distance between the anvil and the ultrasonic horn is set to H so that the projections are welded to each other. In this occasion, taking into consideration the transfer velocity of the bag manufacturing machine, the distance L between the anvil and the ultrasonic horn, which is positioned at the lowest position, is adjusted so that an appropriate peeling intensity can be obtained.

Successively, the break preventing processing of the seal, such as cutting out of the fixed position on the zipper located at the closed end, is carried out by means of the zipper closed end processing apparatus V8, and after the end portion of the zipper is point sealed by means of the ultrasonic heat sealing machine V9, the slider is installed at the position, where the break preventing processing of the seal has been carried out, by means of the automatic slider installing machine V10. In this occasion, the slider is supplied from the automatic slider supply machine V101.

Successively, after the end portion of the zipper and the film portion of the bag body are heat sealed in a direction perpendicular to the zipper by means of the vertical heat sealing machine V11, the heat sealed portion at the end portion of the zipper is cut off by means of the guillotine cutter V13, and thus, the product, i.e., the bag body V14 fitted with the hermetic plastic zipper fitted with the slider wherein the engaging portion are welded through the readily peelable plastic layer, can be produced.

The embodiments of the bag body equipped with the hermetic zipper fitted with the slider have been explained above, and in any case of the embodiments, when the automatic slider installing machine does not work, the bag body equipped with hermetic zipper with no slider can be produced.

EXAMPLE 1

It is such a plastic zipper as illustrated in FIG. 3(a). The zipper has a pair of male and female hooks, respectively, formed on the surfaces of a tape shaped plastic film F, the material of which is linear low density polyethylene (L-LDPE), and further, it has a continuous tightening wall 1-2 inside the male hook 1-1 and parallel thereto and a continuous pressing rib 1-4 inside the female hook 1-3 and parallel thereto. The continuous pressing rib 1-4 has a readily peelable plastic layer A-2 formed on the surface thereof, the material of which is the mixture of ethylene vinyl acetate derivatives (EVA) and which had a peeling strength of 0.6 kgf/15 mm (which was measured in accordance with the method of JIS Z0238) when it was adhered at a temperature of 104° C. The opening width η1 of the female hook was 1.5 mm, and the width η2 of the base part of the continuous pressing rib was 0.4 mm.

Under the preceding step of fitting with slider, and under the engaged condition of the plastic zipper (the condition illustrated in FIG. 3(b)), the height H of the plastic zipper, wherein the engaging portions were not welded, was 2.0 mm, the width η3 of the zipper was 3.0 mm, and flexure range in a direction of H was maximum 0.3 mm. Fifteen samples having 5 cm length were extracted at random from the zippers wherein the engaging portions had not been welded, and the opening intensity of the mouth side of the zipper was measured, and as a result, the average was 1.14 kgf/5 cm and the standard deviation was 0.30 kgf/5 cm. (The opening intensity means the tensile strength required for opening the zipper, and it is measured using the plastic zipper cut in 5 cm long by means of the tensile strength measuring apparatus by connecting the flange portions of the male and female hooks of the zipper to the tensile strength measuring apparatus, and the tensile strength required for opening the zipper is measured. A unit is kgf/5 cm.)

In the ultrasonic welding apparatus illustrated in FIG. 1 and FIG. 2, the engaging portions of the plastic zipper under the engaged condition was sandwiched between the ultrasonic horn H-1 and the anvil AV-1, the distance therebetween was adjusted to 1.9 mm by using the fine height adjustment portion AV-2. In this occasion, the gap of the sliding guides SG-1 and SG-2 was kept at 3.2 mm, and they were so positioned that the center line of the ultrasonic horn and the center line of the continuous pressing rib 1-4 of the zipper were overlapped with each other.

The ultrasonic horn H-1 was so shaped that it had a length Lh of 50 mm and a width Wh of 5.0 mm, while the anvil AV-1 was so shaped that it had a length La of 30 mm and a width Wa of 1.4 mm. Both the ends of the ultrasonic horn H-1 and the anvil AV-1 were formed in an arc shape (R=10 mm), respectively, in a lengthwise direction, and both the ends parallel to the zipper were also formed in an arc shape (R=0.1 mm), respectively.

As the apparatus for welding the engaging portions of the plastic zipper, such an apparatus as illustrated in FIG. 10 was used. The tape-shaped plastic zipper was prepared on the reel 6-1, ultrasonic vibration wherein the frequency was set at 40 KHz and wherein the amplitude was set at 40 micron was continuously applied to the ultrasonic horn, and the engaging portions of the plastic zipper were welded through the readily peelable plastic layer in a lengthwise direction of the zipper by passing them at a constant speed through the distance L between the ultrasonic horn H-1 and the anvil AV-2 which was adjusted to 1.9 mm as mentioned above. The plastic zipper, the engaging portions of which had been welded, was taken up at a constant velocity by means of the roll 6-3 equipped with the take-up speed controller SC, and it was wound onto the reel 6-5 through the dancing roll 6-4.

The take-up speed by the take-up roll 6-3 was set at 3 levels, which are 10 m/sec, 20 m/sec, and as 40 m/sec, and under each level welding operation was done for 200 m, respectively. Fifteen (15) samples having the length of 5 cm were extracted at random from respective zippers, and whether the engaging portions of the zipper had been welded or not was evaluated by examining the opening intensity (unit is kgf/5 cm) of the zipper at the mouth side.

When the take-up velocity was 40 m/sec, the average opening intensity was 2.14 kgf/5 cm and its standard deviation was 0.47 kgf/5 cm. Moreover, after the zipper was opened by peeling off the welded portion and was engaged again, and the opening intensity at the mouth side was measured again, and the average was 1.16 kgf/5 cm, and the standard deviation was 0.33 kgf/5 cm.

When the take-up velocity was 20 m/sec, the average opening intensity was 4.33 kgf/5 cm and its standard deviation was 0.75 kgf/5 cm. Moreover, after the zipper was opened by peeling off the welded portion and was engaged again, and the opening intensity at the mouth side was measured again, and the average was 1.15 kgf/5 cm, and the standard deviation was 0.31 kgf/5 cm.

When the take-up velocity was 10 m/sec, the average opening intensity was 2.69 kgf/5 cm and its standard deviation was 0.74 kgf/5 cm, and after the zipper was opened by peeling off the welded portion and was engaged again, and the opening intensity at the mouth side was measured again, and the average was 1.14 kgf/5 cm, and the standard deviation was 0.30 kgf/5 cm.

As a result of the observation of the cross sections of the zippers, it was found that the continuous tightening wall and the continuous pressing rib were welded through the readily peelable plastic layer. Furthermore, it was observed that when transfer velocity was 40 m/sec, the welding area was small, and welding shape was linear, that when transfer velocity was 20 m/sec, the area became larger than that in the case of 40 m/sec, and that when transfer velocity was 10 m/sec, the welding area was about 30% larger than the that in the case of 20 m/sec.

Because the opening intensity of the mouth side after welding was significantly increased than that before welding, it was judged that by transferring the plastic zipper in a lengthwise direction, the continuous tightening wall and the continuous pressing rib had been continuously welded through the readily peelable plastic layer in a lengthwise direction.

Furthermore, it was recognized from the results of the above-mentioned observation that the welding area decreased at high transfer velocity and that it increased at the low transfer velocity. Accordingly, it was judged that the grade of the welding at the welding portion could be adjusted by changing the transfer velocity in a lengthwise direction. Also it was judged that the hook of the zipper had not been deformed because the opening intensities of the zipper under the re-engaged condition after peeling off the welded portion of the zipper did not differ significantly from the opening intensity of zipper before welding, in any transfer velocities.

Since the standard deviation at 40 m/sec greatly differed from those at 10 m/sec and 20 m/sec, it was thought that there were the different exfoliation mechanisms between these cases. In the case of 10 m/sec, although the average of the opening intensities differed from that of 20 m/sec, the standard deviation was almost the same, and therefore it was thought that they belonged to the same exfoliation mechanism.

As for a reason that the average opening strength of the zipper in case of 10 m/min was smaller than that of 20 m/min, although the welding area in case of 10 m/min was larger than that of 20 m/min, the peeling angle that was observed by a microscope at the peeling starting point in case of 10 m/min was smaller than that of 20 m/min, and therefore it seemed that it was because the peeling strength at the peeling starting point in case of 10 m/min was lower than that of 20 m/min.

Using the three kinds of hermetic zippers which were obtained by welding the engaging portions at speeds of the above mentioned 10, 20 and 40 m/min, respectively, bags equipped with three kinds of hermetic zippers at the upper portions thereof were made. The bags were made of laminated film, the materials of which were 60 micron L-LDPE at inside and with 15 micron polyamide at outside, and bags were flat bags equipped with slider having the mouth at the bottom portion, their size were 140 mm width×200 mm height, and forty five (45) bags were produced which were made of each fifteen (15) bags corresponding to three (3) kinds of hermetic zippers. The sliders which were the same type as that the present inventor previously disclosed in the patent document 8 (WO 01/022697 A1), (it was fitted with at about upper half portion of the slider and it was assembled by closing the extended portion), were fitted to all bags in such a manner that the portions provided with the opening guides S1 and S2 extended upward, that they were attached to the zippers while they are open, and that after the S3 portion was closed, they were fitted with the zipper.

Each of these bags was filled with 500 cc water from the bottom portion, and the bottom portion was heat sealed. After the weight of each bag had been measured, the bag had been left alone for 30 days under the condition wherein the zipper portion had been directed downward, neither leakage of water from any bags nor differences on weight of any bags were observed. It was judged that the function of sealing was provided in the zipper, the engaging portions of which had been welded.

When the zipper portion of all bags were opened after bags had been left alone for 30 days, all of them were able to open without any problems. Successively, after the zipper portions of all the bags had been re-closed and had been let alone for 48 hours under the condition wherein the zipper portions had been directed downward, no leakage of water from any bags were observed. Therefore, it was judged that the function of the zippers after opening had no problems.

INDUSTRIAL APPLICABILITY

The hermetic zipper of the present invention provides a characteristic of airtight as well as of tamper evidence, and therefore, the packaging bag equipped with the re-sealable mouth can be widely applied to such products as foods, medicines and electric parts which requires high air-tightness and which requires prevention from unfair contamination of the foreign substance.

BRIEF DESCRIPTION OF THE DRAWINGS

FIGS. 3(a) to 3(e) are sectional views of embodiments in various forms or states of the plastic zipper of the present invention. The hatching lines showing the section are omitted, and the hatched portions indicate the portion where readily peelable plastic layer is disposed.

FIG. 9 It is a sectional view of a plastic zipper with a slider of the present invention, wherein FIG. 9(a) is a sectional view corresponding to the section taken along line A-A' in FIG. 8, FIG. 9(a) is a sectional view corresponding to the section taken along line B-B' in FIG. 8, FIG. 9(c) is a cross sectional view similar to that of FIG. 9(a) and showing the state wherein another plastic zipper fitted with a slider of the present invention, FIG. 9(d) is a cross-sectional view similar to that of FIG. 9(b), and FIG. 9(e) is a cross-sectional view explaining the structure for nullify the opening force from the opening guide of the slider S positioned at the closed end of the zipper.

Figure 1:
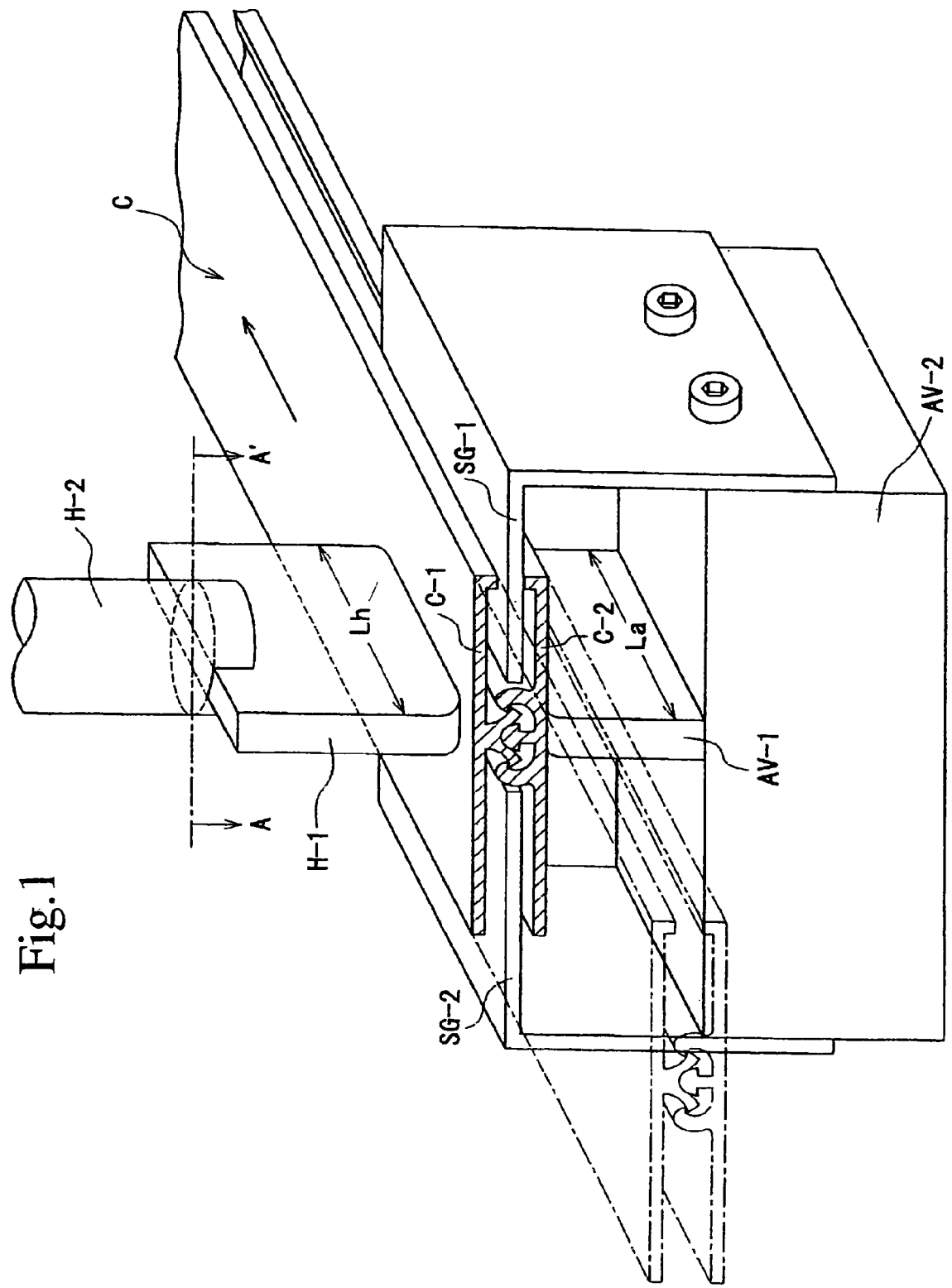
FIG. 1 It is a perspective view of an example of an ultrasonic welding equipment used for manufacturing a plastic zipper of the present invention.
Figure 2:
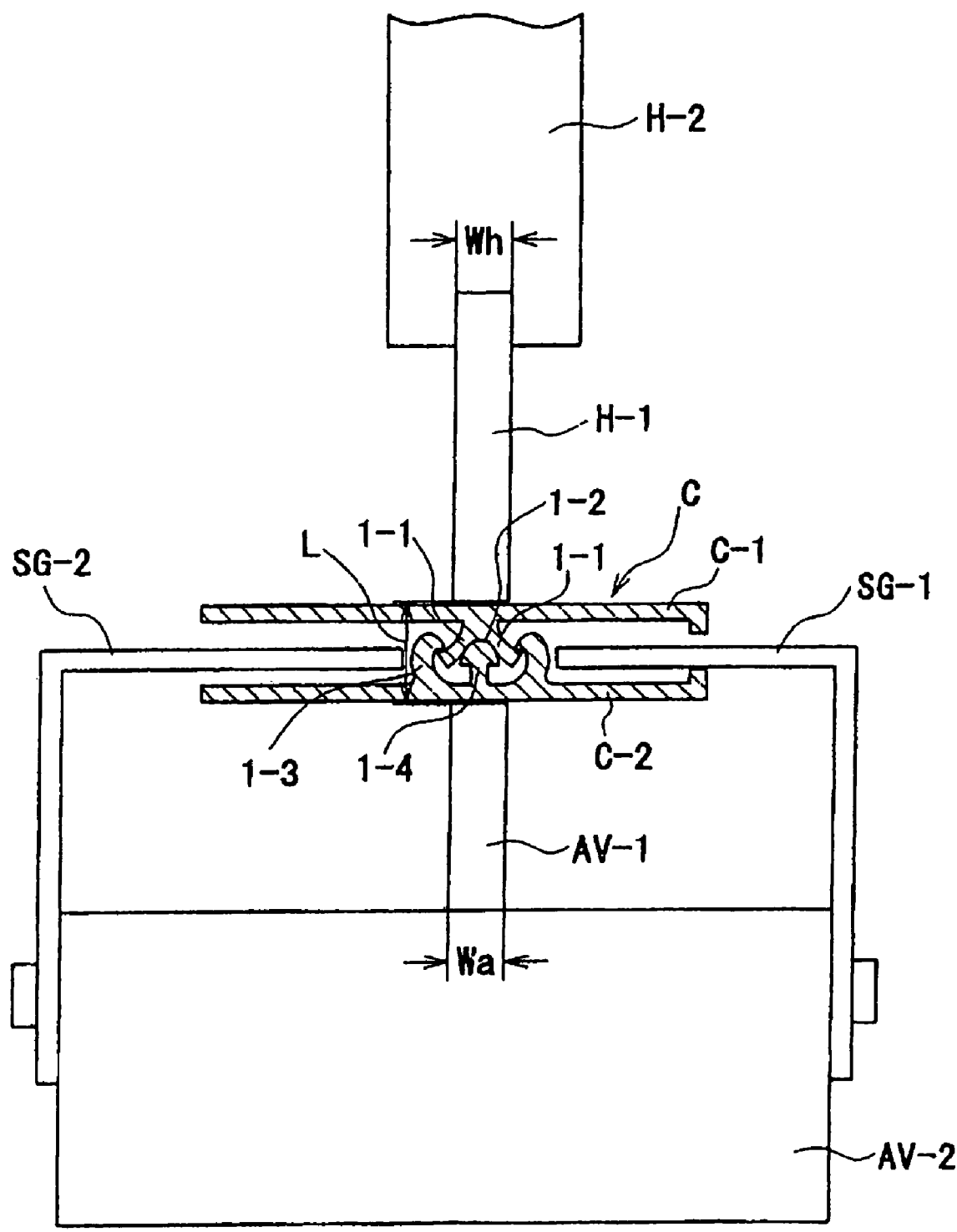
FIG. 2 It is a sectional view taken along line A-A' of the equipment illustrated in FIG. 1, and it illustrates the state wherein an embodiment of the plastic zipper of the present invention is grasped. The hatching lines showing the section are partially omitted.
Figure 4:
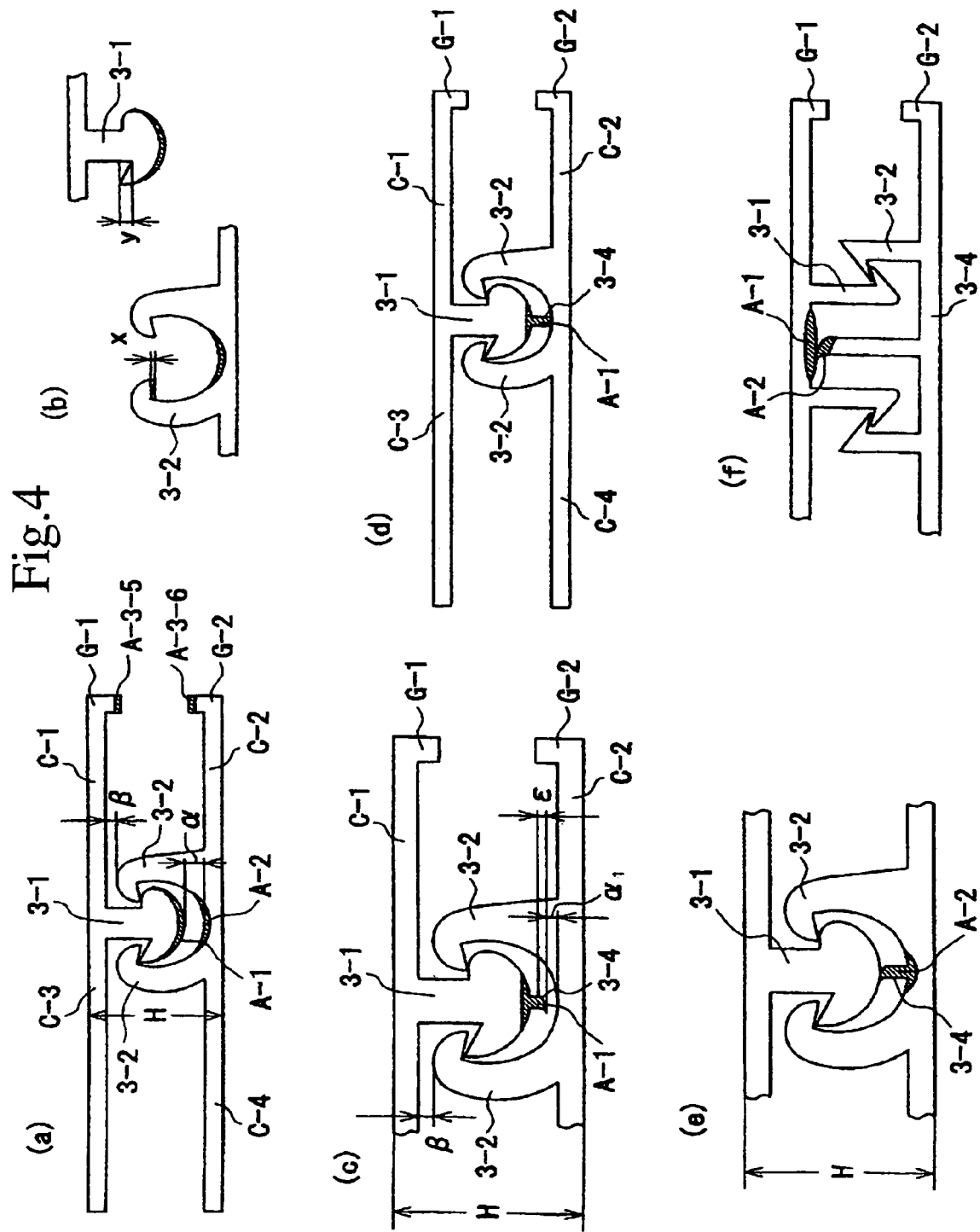
FIGS. 4(a) to 4(f) are sectional views of embodiments in various forms or states of the plastic zipper of the present invention. The hatching lines showing the section are omitted, and the hatched portions indicate the portions where readily peelable plastic layer is disposed. The plastic zippers illustrated in FIG. 4 are of types which have male and female hooks and which are welded at the inside of the female hook.
Figure 5:
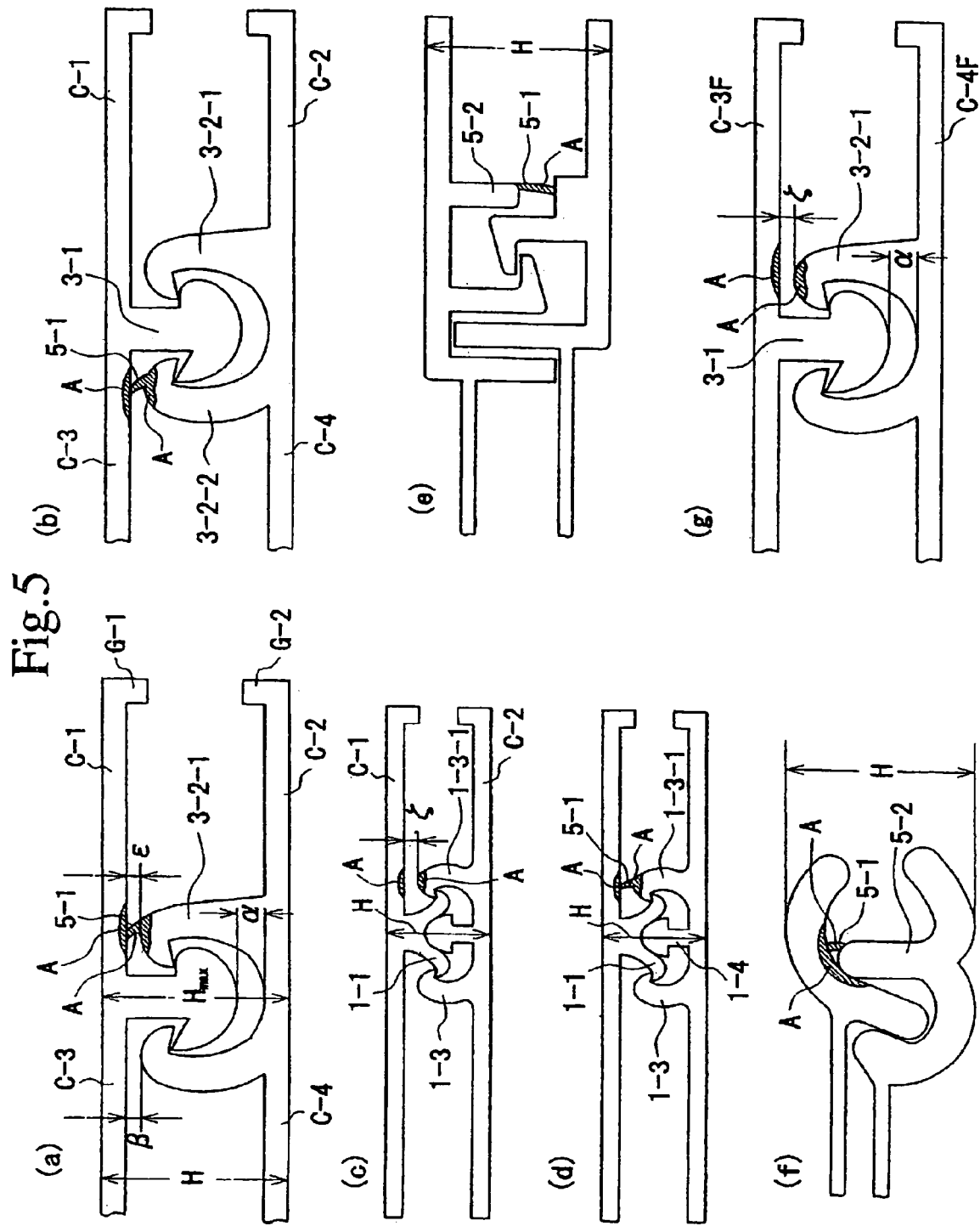
FIGS. 5(a) to 5(g) are sectional views of embodiments in various forms or states of the plastic zipper of the present invention. The hatching lines showing the section are omitted, and the hatched portions indicate the portions where readily peelable plastic layer is disposed. The plastic zippers illustrated in FIG. 5 are of types which are welded to the flange portions at the outer surface of the engaging portions.
Figure 6:
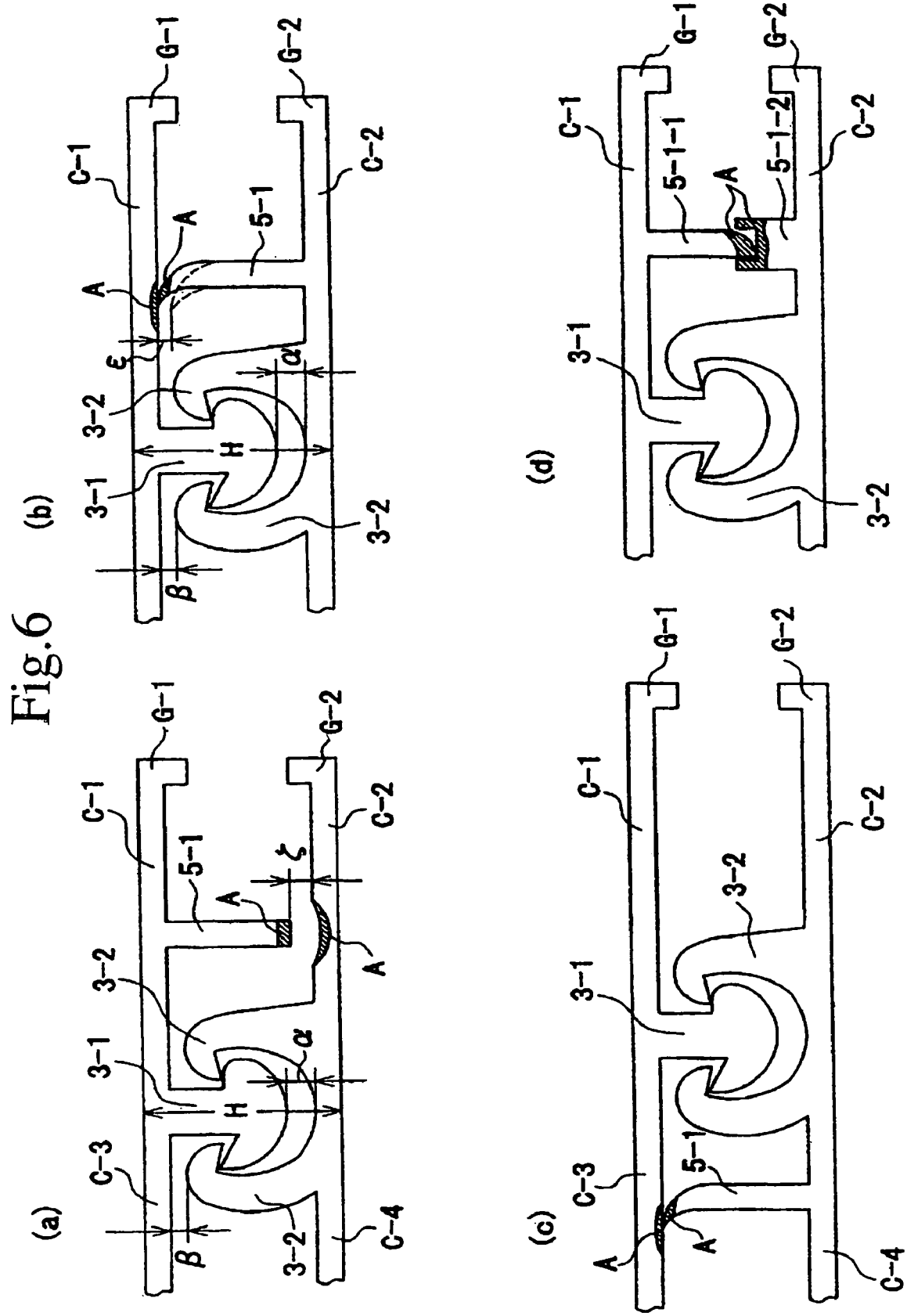
FIGS. 6(a) to 6(d) are sectional views of embodiments in various forms or states of the plastic zipper of the present invention. The hatching lines showing the section are omitted, and the hatched portions indicate the portions where readily peelable plastic layer is disposed. The plastic zippers illustrated in FIG. 6 are of types wherein the projections disposed near the engaging portions and the flange portions facing them are welded.
Figure 7:
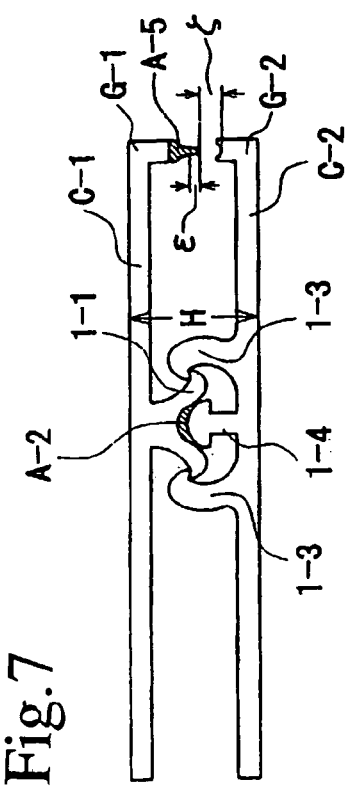
FIG. 7 It is a sectional view of a still other embodiment of the present invention which is of a type wherein the projection at the end of mouth is welded. The hatching lines showing the section are omitted, and the hatched portions indicate the portions where readily peelable plastic layer is disposed.
Figure 8:
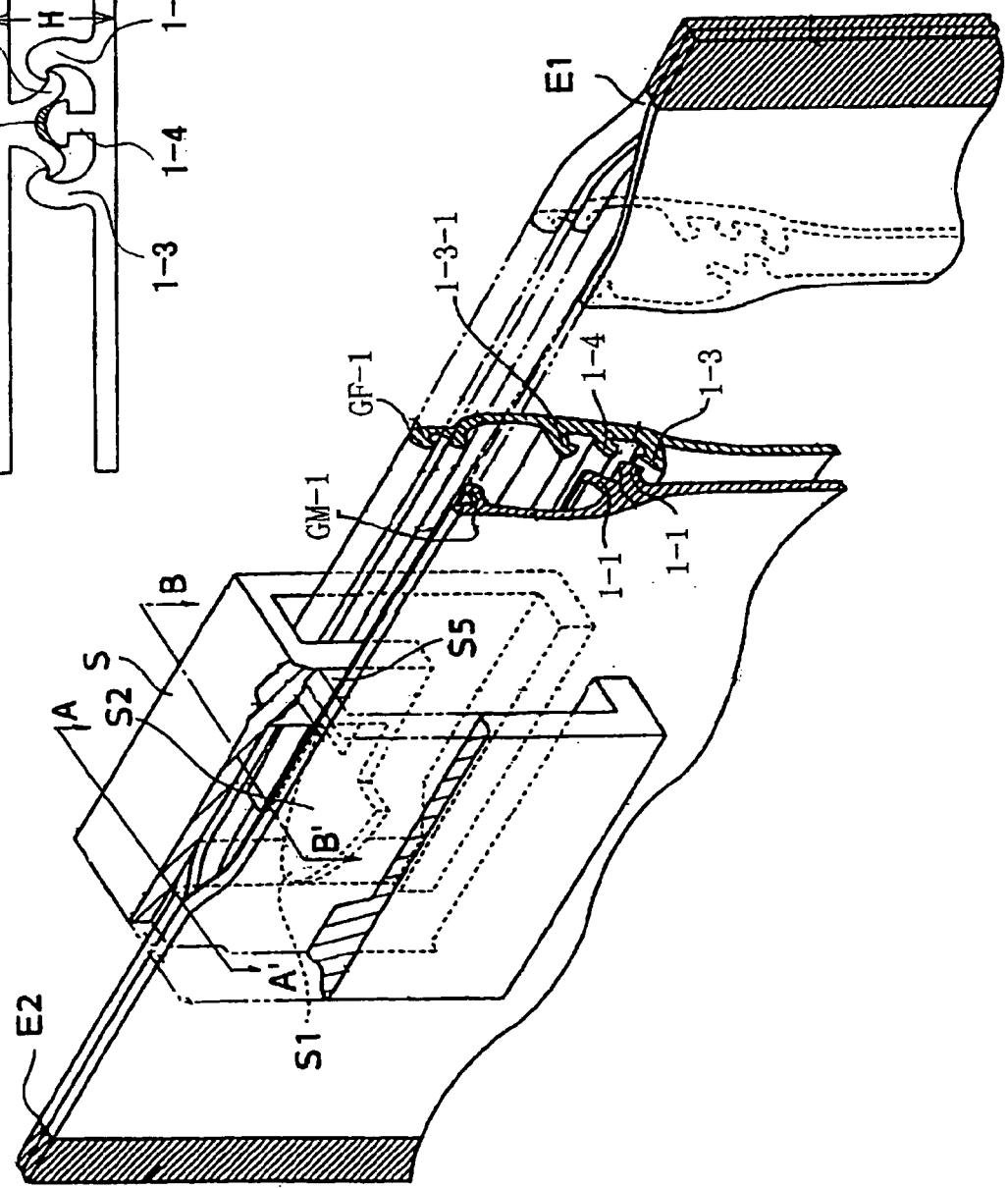
FIG. 8 It is a diagrammatical perspective view of a bag equipped with a plastic zipper with a slider of the present invention, a part of which, i.e., the plastic zipper part, is cut off.
Figure 9:
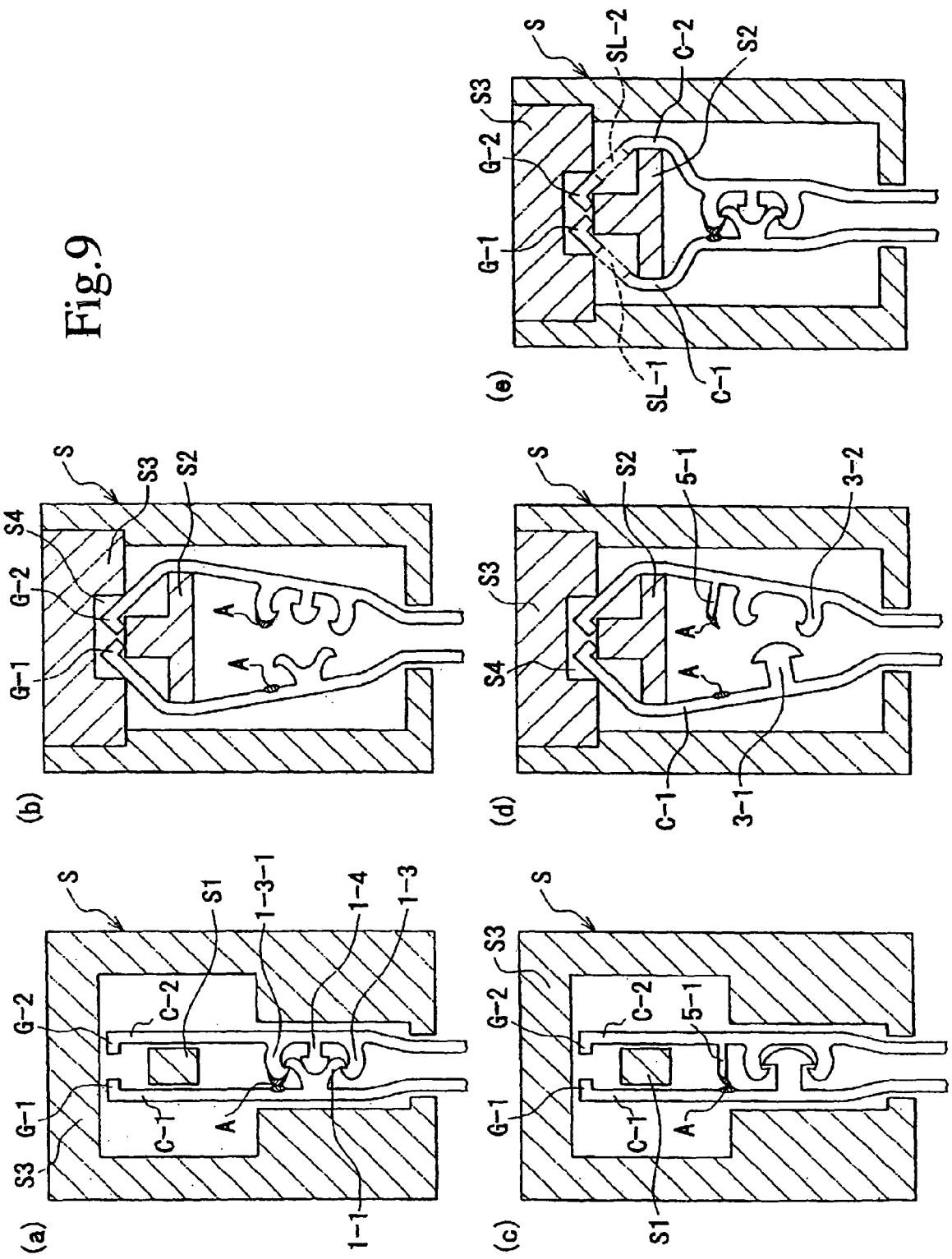
Figure 10:
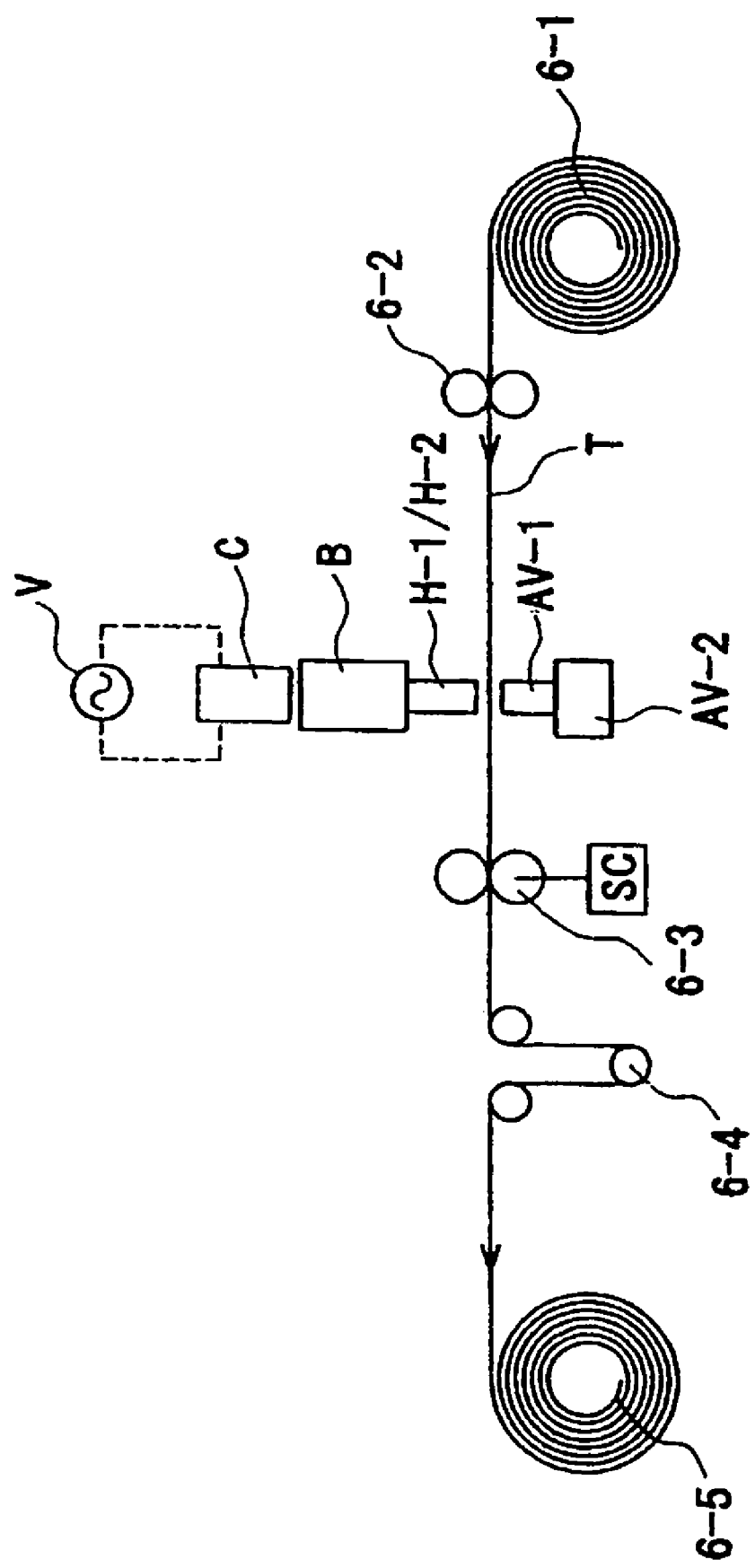
FIG. 10 It is a view showing a process wherein the engaging portions of the tape-like zipper are continuously welded in a lengthwise direction of the zipper by means of ultrasonic vibration according to the method of the present invention.
Figure 11:
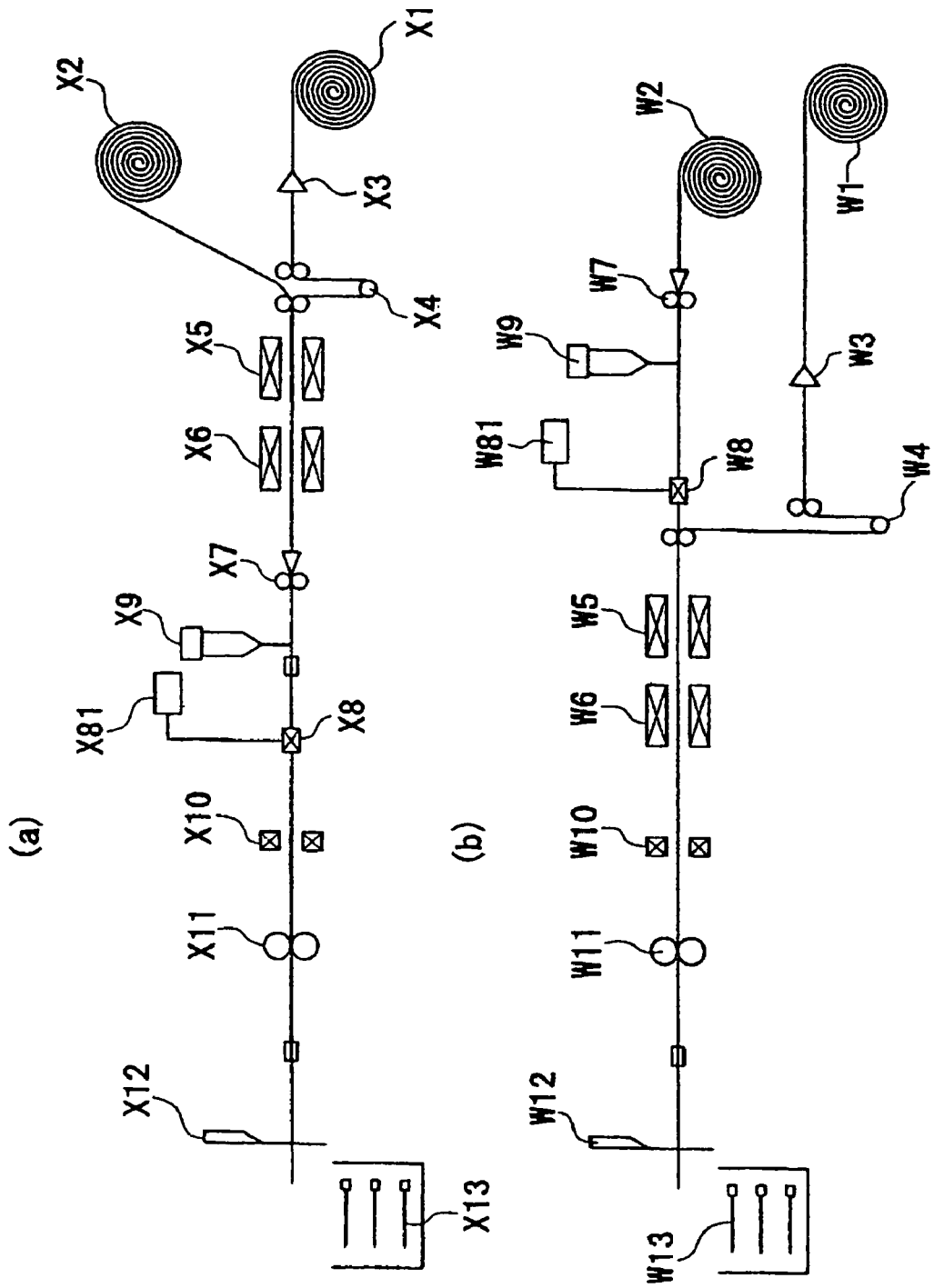
FIGS. 11(a) and 11(b) are process diagrams of different embodiments, respectively, wherein the plastic zipper of the present invention is fitted on the bag.
Figure 12:
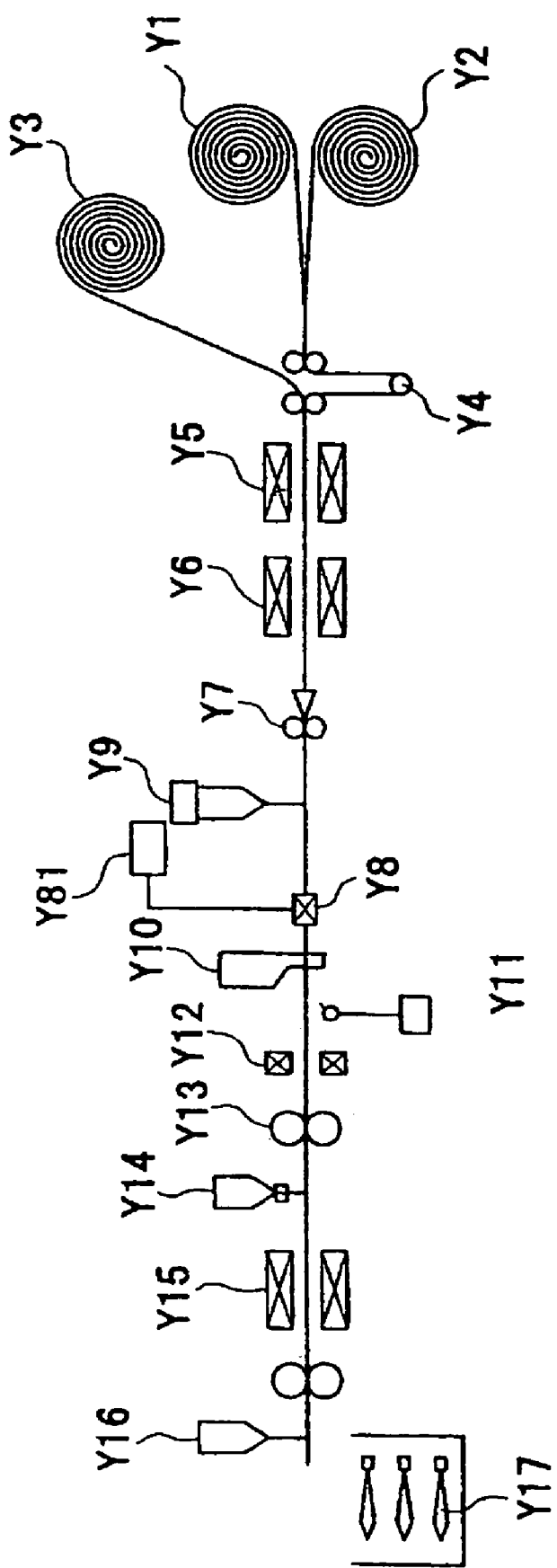
FIG. 12 It is a view showing a process wherein the hermetic zipper with slider of the present invention in which the engaging portions are welded through readily peelable plastic layer is installed so as to continuously carry out bag making process including filling of contents into the bags.
Figure 13:
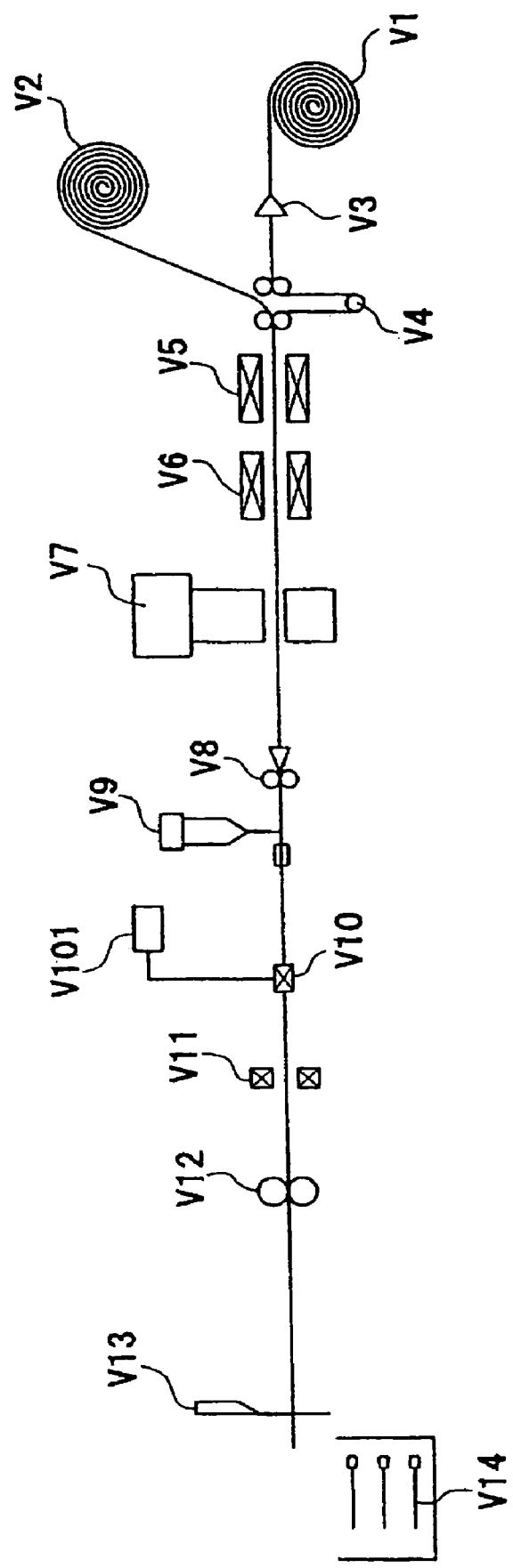
FIG. 13 It is a view showing a process wherein the hermetic zipper with slider of the present invention in which the readily peelable plastic layer is disposed at the projections for the FIG. 14 It is a partially cross sectioned perspective view of a conventional example of a plastic zipper with a slider which has a tamper evidence function.
Figure 14:
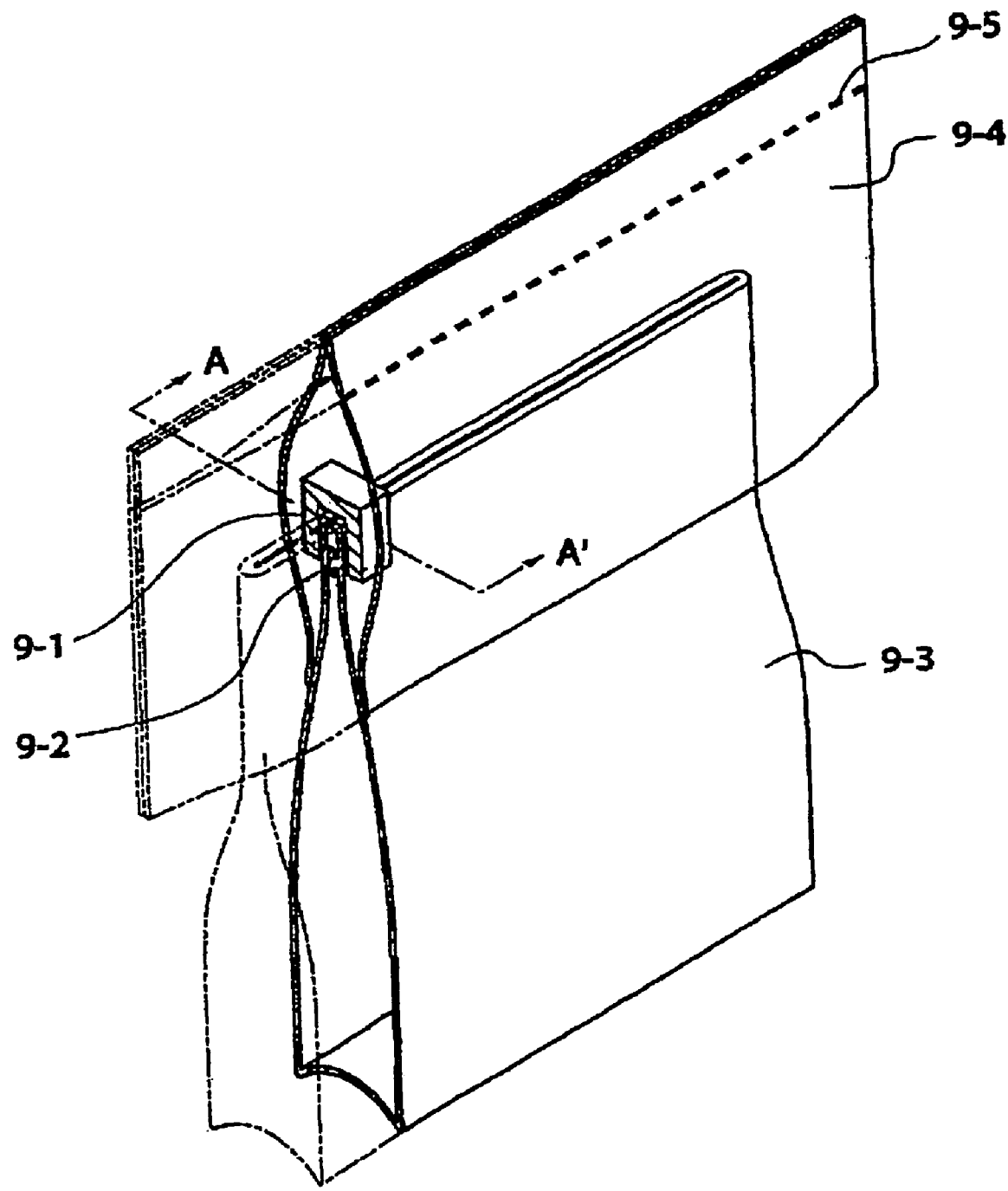
Figure 15:
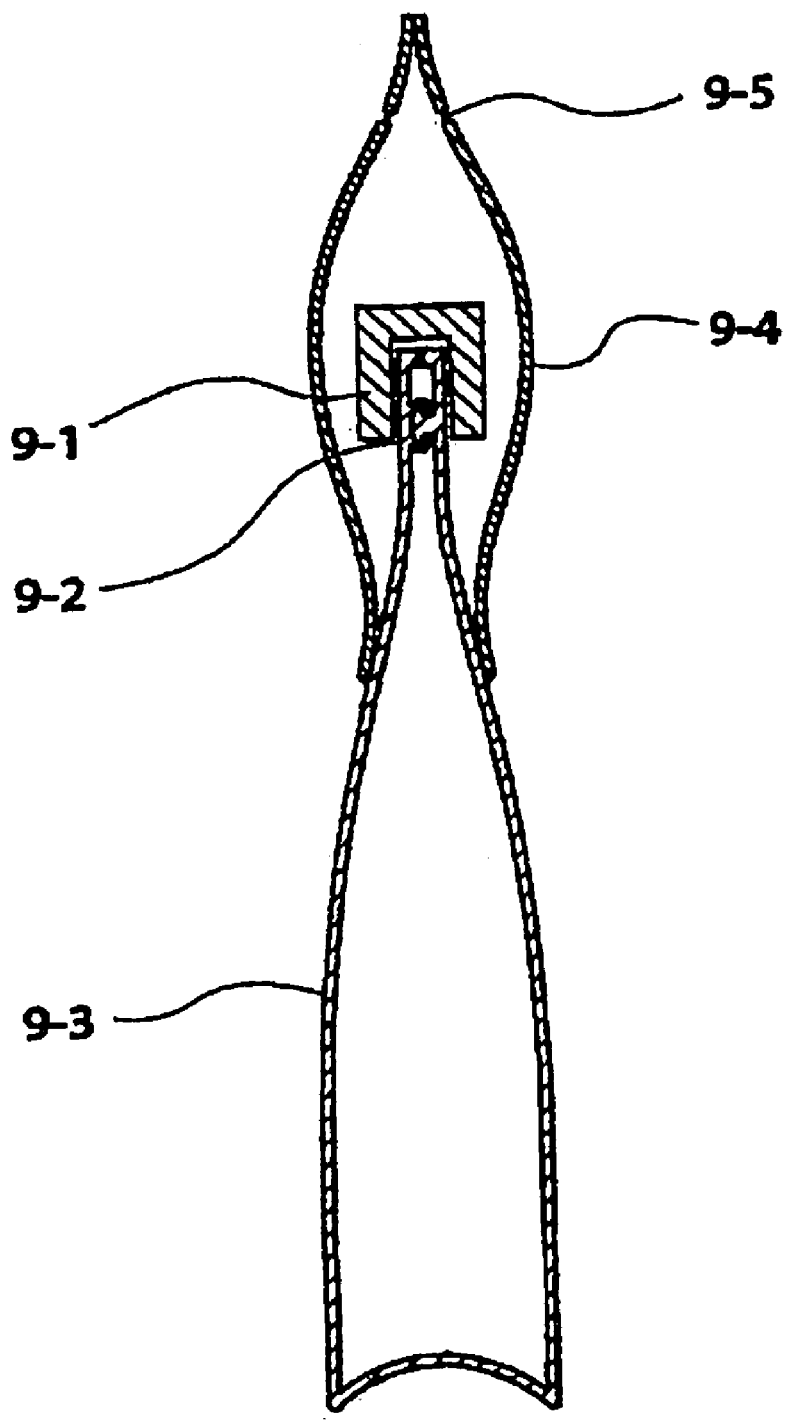
FIG. 15 It is a cross sectioned view taken along arrows A-A' in FIG. 14.
Figure 16:
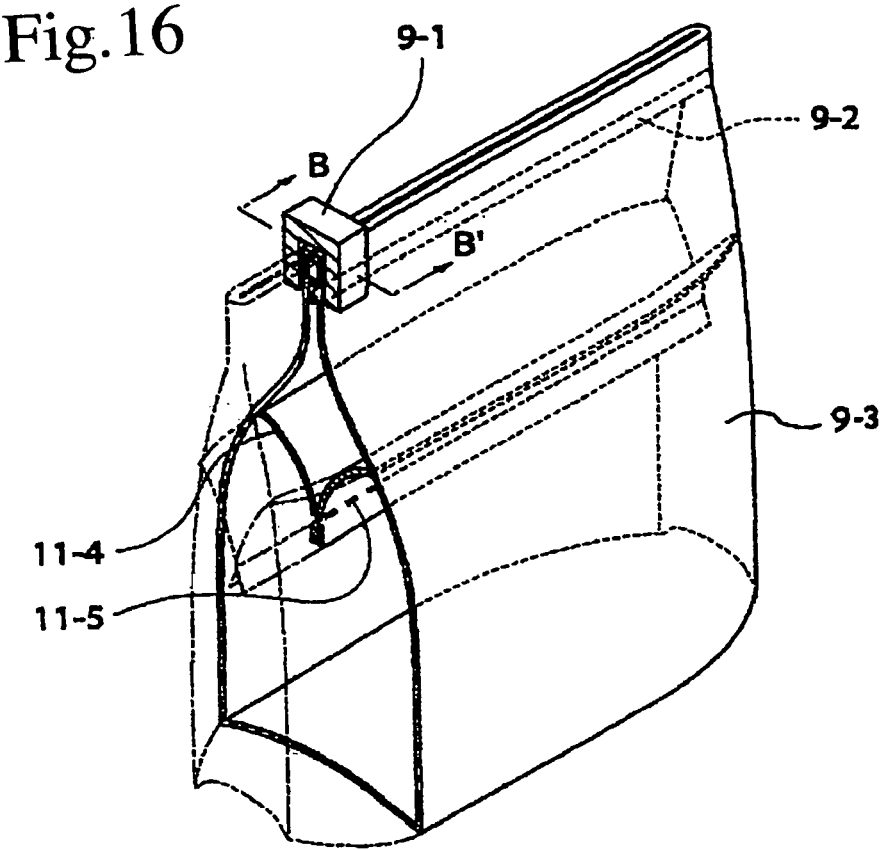
FIG. 16 It is a partially cross sectioned perspective view showing another conventional example of a plastic zipper with a slider which has a tamper evidence function.
Figure 17:
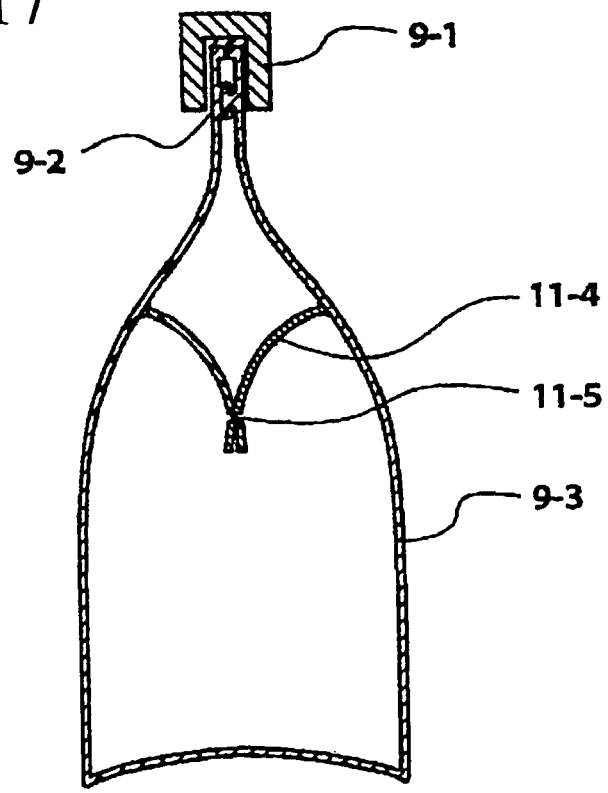
FIG. 17 It is a cross sectioned view taken along arrows B-B' in FIG. 16.

It is cross-section on B-B' arrow view of FIG. 16.

Figure 18:
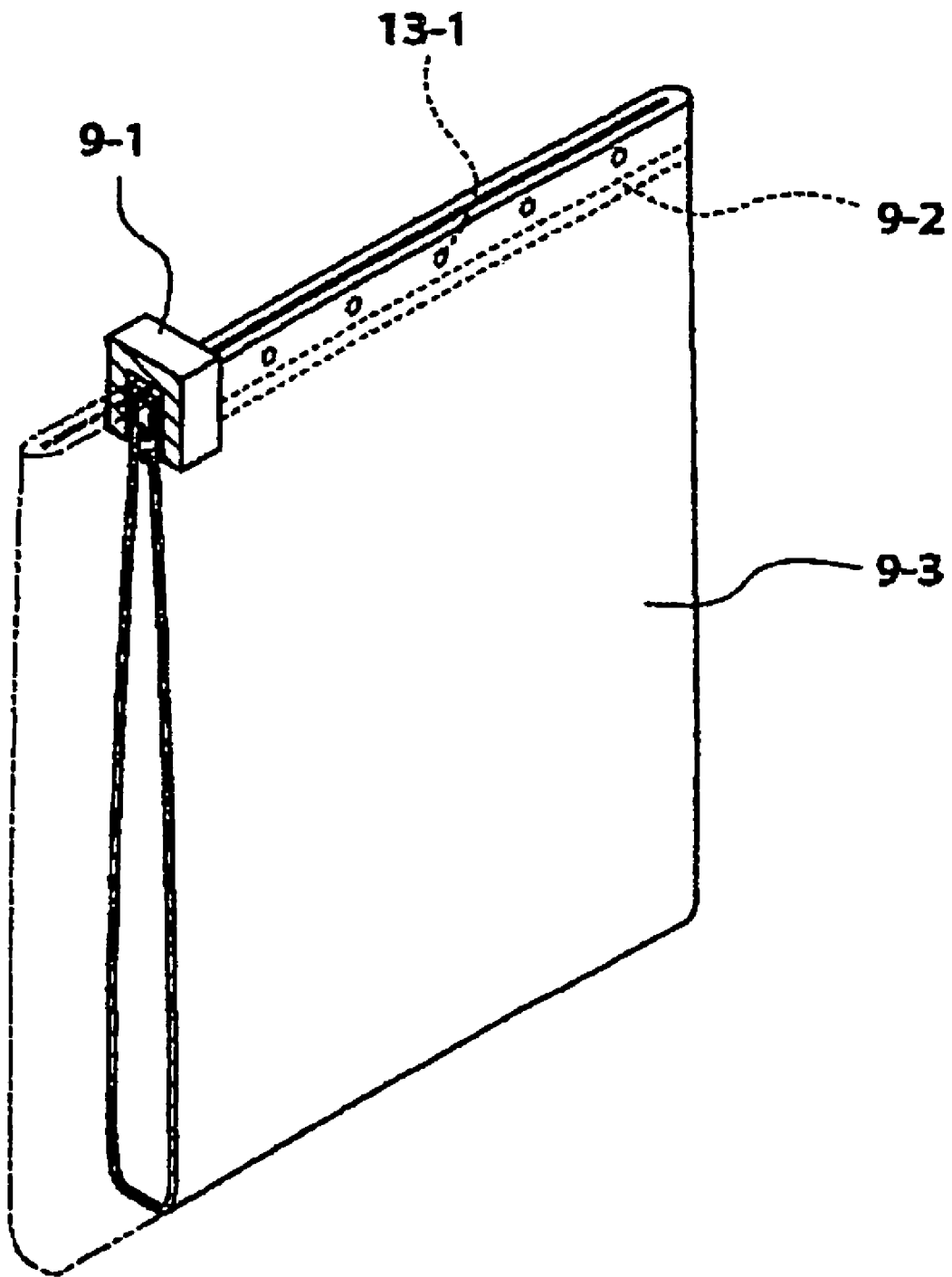

FIG. 18 It is a partially cross sectioned perspective view showing a still other conventional example of a plastic zipper with a slider which has a tamper evidence function.

Figure 19:
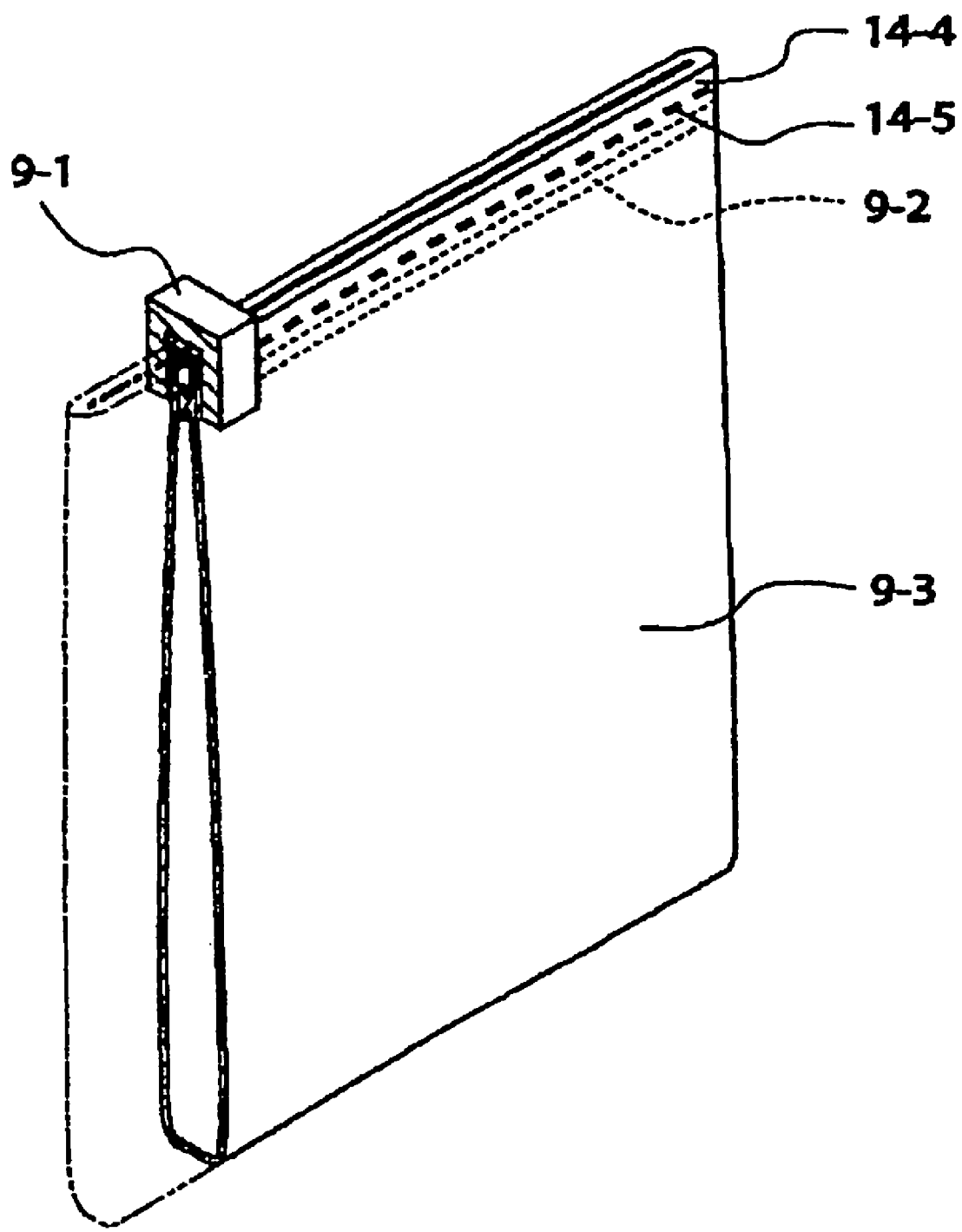

FIG. 19 It is a partially cross sectioned perspective view showing a further other conventional example of a plastic zipper with a slider which has a tamper evidence function.

EXPLANATION OF THE REFERENCE NUMERALS

H-1 ultrasonic horn
AV-1 anvil
C plastic zipper
L distance between an ultrasonic horn and an anvil
H maximum thickness of a plastic zipper under the engaging state
1-1, 1-3 hooks
1-4 continuous pressing rib
3-1 male hook
3-2 female hook
3-4 projection
5-1 projection
A readily peelable plastic layer
C-1, C-2 flange portion at the mouth side
G-1, G-2 projections for fitting slider

The invention claimed is:

1. A manufacturing method of a hermetic plastic zipper wherein the plastic zipper comprises a pair of engaging portions formed on the surfaces of plastic films and has a readily peelable plastic layer prolonging in a lengthwise direction of the plastic zipper at the engaging portions or in the neighborhood thereof, the method is characterized in that while the engaging portions are brought into a engaged state, the portion of the plastic zipper where the readily peelable plastic layer exists is inserted between an ultrasonic horn and an anvil, and the readily peelable layer is welded by using ultrasonic wave under a condition wherein the distance L between the ultrasonic horn and the anvil is uniformly held at a distance of $H \geqq L \geqq 0.85H$ wherein H stands for a maximum thickness of the plastic zipper under the engaged state, and the plastic zipper sandwiched between the ultrasonic horn and the anvil is moved in a lengthwise direction thereof, whereby the readily peelable plastic layer is welded continuously in a lengthwise direction of the zipper.

2. The manufacturing method of the hermetic plastic zipper according to claim 1, characterized in that an adhesion intensity of the adhered portion by the readily peelable layer is controlled by changing the velocity of the plastic zipper in a lengthwise direction of the zipper.

3. The manufacturing method of the hermetic plastic zipper according to claim 1, characterized in that at least either the width of an ultrasonic horn or the width of an anvil is smaller than the open width of a female hook of the plastic zipper under the engaging state.

* * * * *